US012620915B2

(12) United States Patent　　(10) Patent No.:　US 12,620,915 B2
Ware et al.　　　　　　　　　　　(45) Date of Patent:　　May 5, 2026

(54) MAGNETIC LEVITATION OF PERMANENT MAGNET FOR THREE-AXIS ATTITUDE CONTROL

(71) Applicant: SRI International, Menlo Park, CA (US)

(72) Inventors: Matthew Ware, Berkeley, CA (US); Alexander Rider, Boulder, CO (US); Allen Hsu, Sunnyvale, CA (US); Mark Tinkle, Paso Robles, CA (US)

(73) Assignee: SRI International, Menlo Park, CA (US)

( * ) Notice: Subject to any disclaimer, the term of this patent is extended or adjusted under 35 U.S.C. 154(b) by 133 days.

(21) Appl. No.: 18/541,913

(22) Filed: Dec. 15, 2023

(65) Prior Publication Data

US 2024/0380340 A1　　Nov. 14, 2024

Related U.S. Application Data

(60) Provisional application No. 63/465,753, filed on May 11, 2023.

(51) Int. Cl.
| | |
|---|---|
| *H01H 47/00* | (2006.01) |
| *B64G 1/28* | (2006.01) |
| *H01F 7/06* | (2006.01) |
| *H02N 15/00* | (2006.01) |
| *G05D 1/49* | (2024.01) |

(52) U.S. Cl.
CPC ............. *H02N 15/00* (2013.01); *B64G 1/283* (2013.01); *H01F 7/064* (2013.01); *G05D 1/49* (2024.01)

(58) Field of Classification Search
CPC ....................................................... H02N 15/00
See application file for complete search history.

(56) References Cited

U.S. PATENT DOCUMENTS

| | | | |
|---|---|---|---|
| 7,505,243 B2 | 3/2009 | Davis et al. | |
| 9,475,592 B2 * | 10/2016 | Stagmer | H02K 41/031 |
| 10,532,832 B2 | 1/2020 | Zhang et al. | |

(Continued)

OTHER PUBLICATIONS

Seddon, "3Dwheel—Attitude Control of Small Satellites Using Magnetically Levitated Momentum Wheels", Surrey Space Centre, Faculty of Engineering and Physical Sciences, Oct. 2011, 254 pages.

(Continued)

*Primary Examiner* — Stephen W Jackson
(74) *Attorney, Agent, or Firm* — McDonnell Boehnen Hulbert & Berghoff LLP

(57) ABSTRACT

Embodiments provided herein include rotatable magnets (e.g., spherical dipole magnets) disposed within sets of coils that can be used to operate the magnets as reaction/momentum "spheres" and/or as control moment gyroscopes. The coils are able to exert three-dimensional torques onto the magnet in order to effect attitude control of a satellite or other system. The coils can also optionally exert translational forces onto the magnet in order to maintain the magnet in position and avoid contact with static components. Diamagnetic materials can also be included to provide stabilizing repulsive magnetic forces to maintain the magnet in position and/or to reduce the necessary performance of the coils with respect to applying stabilizing translational forces.

20 Claims, 12 Drawing Sheets

(56) References Cited

U.S. PATENT DOCUMENTS

| | | | |
|---|---|---|---|
| 2013/0303847 A1* | 11/2013 | Sitti | A61B 1/018 |
| | | | 600/101 |
| 2014/0209751 A1 | 7/2014 | Stagmer | |
| 2018/0170581 A1* | 6/2018 | Zhang | B64G 1/283 |
| 2022/0040850 A1* | 2/2022 | Zhang | B25J 9/12 |

OTHER PUBLICATIONS

Samuel et al., "An Overview on Aerospatiale Magnetic Bearing Products for Spacecraft Attitude Control and for Industry", pp. 217-227.

Yuan et al., "Design and Optimization of a magnetically Levitated Inductive Reaction Sphere for Spacecraft Attitude Control", Energies, Apr. 24, 2019, vol. 12, 18 pages, www.mdpi.com/journal/energies.

Miyasaka et al., "Magnetic levitation with unlimited omnidirectional rotation range", Mechatronics 24 (2014), pp. 252-264.

Xu et al., "Realization of a Diamagnetically Levitating Rotor Driven by Electrostatic Field", IEEE/ASME Transactions on Mechatronics, vol. 22, No. 5, Oct. 2017, pp. 2387-2391.

Seddon et al., "3-D Wheel: A Single Actuator Providing Three-Axis Control of Satellites", Journal of Spacecraft and Rockets, vol. 49, No. 3, May-Jun. 2012, pp. 553-556.

Tuysuz et al., "A 300 000-r/min Magnetically Levitated Reaction Wheel Demonstrator", IEEE Transactions on Industrial Electronics, vol. 66, No. 8, Aug. 2019, pp. 6404-6407.

Howard et al., "Magnetic Levitation for Long-Life Space Mechanisms: Technology Assessment and Remaining Challenges", NASA/TM, Dec. 2019, 18 pages.

Beams, "Magnetic Suspension for Small Rotors", The Review of Scientific Instruments, vol. 21, No. 2, Feb. 1950, 4 pages.

Schuck et al., "Ultrafast rotation of magnetically levitated macroscopic steel spheres", Science Advances, vol. 4, Jan. 5, 2018, 7 pages.

* cited by examiner

Magnet inserted during
assembly. Levitation coils
form dodecahedral.

Full assembly 1.9 cm COTS Nd-Fe
magnet sphere

Anti-Helmholtz

Helmholtz

Electromagnets are pre-
wound, then bolted to
acrylic plate. Graphite
discs installed on faces.

MAGNETIC LEVITATION OF PERMANENT MAGNET FOR THREE-AXIS ATTITUDE CONTROL

This application claims priority to U.S. Provisional Patent Application No. 63/465,753, filed May 11, 2023, the contents of which are incorporated by reference.

STATEMENT REGARDING FEDERALLY SPONSORED RESEARCH OR DEVELOPMENT

This invention was made with government support under Contract Number NRO000-21-C-0097 awarded by National Reconnaissance Office. The government has certain rights in the invention.

BACKGROUND

Unless otherwise indicated herein, the materials described in this section are not prior art to the claims in this application and are not admitted to be prior art by inclusion in this section.

Attitude control systems for spaceflight take size, weight, and power away from mission specific hardware. Such attitude control systems can include one or more single-axis mechanical rotors. However, such mechanical rotors are a common point of failure on spacecraft. For example, the failure of a reaction wheel on the Kepler Space Telescope led to the loss of a 500 million USD satellite.

Attitude control in satellites has historically been accomplished using a mechanical reaction wheel or control moment gyroscopes. Such historical attitude control systems (ACS) have used mechanical bearings with finite lifetimes that take size, weight, and power (SWaP) away from the mission. For example, three-axis control on a satellite may be accomplished using four reaction wheels, three for control and one for redundancy. These systems rely on mechanical lubrication with finite lifetimes and physical constraints. Such systems can also be damaged in a space launch or during operation by, e.g., exceeding such constraints.

Rotating wheel ACS (e.g., reaction wheels, control moment gyroscopes) may be used in combination with reaction control thrusters, e.g., to allow momentum absorbed by the rotating wheel(s) to be 'expended' into the space environment, in order to reduce the rate of rotation of the wheel(s) (thereby increasing their lifetime and/or avoiding the rotation rate exceeding design constraints). However, the use of reaction control thrusters in this manner results in the expenditure of propellant, which is limited. Magnetorquers may additionally or alternatievly be used to provide a smaller measure of attitude control, but they only able to provide small amounts of torque.

SUMMARY

In a first aspect, a system is provided that includes: (i) a set of coils; (ii) a magnet disposed within the set of coils such that the magnet has three degrees of freedom of rotation within the set of coils; (iii) a first sensor configured to detect an orientation of the magnet relative to the set of coils; and (iv) a second sensor configured to detect a location of the magnet relative to the set of coils, wherein the set of coils is operable to control a location and orientation of the magnet relative to the set of coils based on outputs of the first sensor and second sensor.

In a second aspect, a system is provided that includes: (i) a set of coils; (ii) a magnet disposed within the set of coils such that the magnet has three degrees of freedom of rotation within the set of coils, wherein the set of coils is operable to control an orientation of the magnet relative to the set of coils; and (iii) diamagnetic material, wherein the diamagnetic material is disposed around the magnet to stabilize the location of the magnet within the set of coils.

In a third aspect, a system is provided that includes: (i) a set of coils; (ii) a magnet disposed within the set of coils such that the magnet has three degrees of freedom of rotation within the set of coils; (iii) a diamagnetic material disposed around the magnet to stabilize the location of the magnet relative to the set of coils; and (iv) a controller configured to operate the set of coils to maintain a location of the magnet relative to the set of coils and to control an orientation of the magnet relative to the set of coils.

DETAILED DESCRIPTION

Figure 1A:
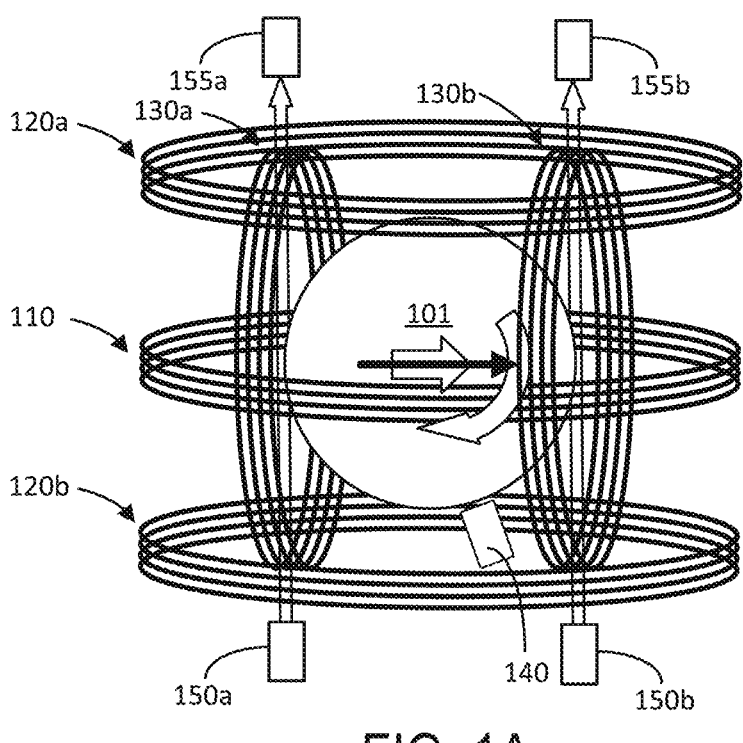
FIG. 1A depicts elements of a system, according to example embodiments

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Attitude control in space systems can include the use of reaction/momentum wheels and/or control moment gyroscopes. These systems allow the space system to 'expend' electricity to control attitude, which may be functionally limitless, rather than relying on propellant for attitude control, which is intrinsically limited. However, prior art non-propulsive attitude control systems often have significant size, weight, and power (SWaP) costs, making them difficult to incorporate into many operational contexts, in particular the highly constrained contexts of very small satellite systems (e.g., CubeSats). Additionally, such prior art systems include mechanical bearings, and associated lubricants, that exhibit wear over time, leading to limitations in system lifetime.

The embodiments described herein incorporate rotatable magnetic masses (e.g., spherical dipole magnets) that are disposed within sets of coils that can be used to exert torques in all three dimensions onto the magnetic masses, allowing the magnetic masses to be used to effect attitude control of a space system. The magnetic masses can be actively (using the set of coils) and/or passively (using diamagnetic materials) levitated within the set of coils, avoiding the use of mechanical bearings and lubricants and thereby extending the operational lifetime of such systems.

Such magnetic masses can be used as control moment gyroscopes and/or as reaction/momentum "spheres" (by way of analogy to reaction/momentum wheels). Such operation has the benefit, relative to prior systems, of reduced SWAP by, e.g., omitting the gimbal when operating as a control moment gyroscope, providing full three-dimensional attitude control in a single device rather than three (or more) reaction/momentum wheels, providing redundant three-dimensional control with fewer individual systems (e.g., only two devices to provide redundant three-dimensional control in case of single device failure, rather than four reaction/momentum wheels for such single-device redundancy), and eliminating idle power requirements by eliminating energy-dissipating bearings. The use of passive levitation of the magnetic mass by diamagnetic materials also allows for failsafe operation in the event of power failure or other system failures, preventing damaging contact between the rotating magnetic mass and enclosing elements and preventing the gradual 'leakage' of momentum that accompanies the use of mechanical bearings in unpowered conventional reaction/momentum wheels or control moment gyroscopes.

FIG. 1A depicts aspects of such a system as described herein. Note that FIG. 1A depicts only a number of example coils in order to illustrate aspects of the use of a set of such coils to levitate and/or rotate a magnetic mass (e.g., a spherical dipole magnet or some otherwise-shaped dipole magnet). In practice, a system as described herein may include more (e.g., additional sets of anti-Helmholtz coils, to exert additional levitation or other translation forces on the magnet, additional sets of coils to exert torques on the magnet in additional directions) or fewer (e.g., only a single coil centered on the magnet for exerting torques on the magnet, only a pair of Helmholtz coils disposed opposite the magnet for exerting torques on the magnet, no anti-Helmholtz coils for exerting translational forces on the magnet) coils than those illustrated in FIG. 1A. The particular configuration and number of coils illustrated in FIG. 1A is intended as a simplified configuration to facilitate explanation of the principles of the embodiments described herein.

The apparatus of FIG. 1A includes a magnet 101. The magnet 101 is a spherical dipole magnet, with the orientation of the magnetic dipole of the magnet 101 indicated by the solid arrow. Note that alternative configurations of magnets (e.g., cylindrical magnets with ends having flat, spherical section, or other shapes, shells of magnetic material that are filled with, e.g., non-magnetic ballast material and having spherical, ellipsoidal, or other geometries) that have three degrees of freedom (DOF) of rotation relative to a set of coils within which the magnets are disposed are possible. The geometrical configuration of the magnet could be specified in order to, e.g., facilitate manufacture of the magnet and/or assembly into an apparatus as described herein, to increase the mass of the controlled rotatable object by replacing some of the magnet's volume with denser but less magnetic materials, or by some other modification. Additionally, note that where such rotatable magnetic objects are described as "spherical" herein, it is to be understood that such objects may deviate from perfect sphericity by some degree without departing from the subject matter described herein. For example, such a "spherical" magnet could be an oblate spheroid or similar near-spherical shape with an eccentricity or similar measure of deviation from sphericity/circularity in any given plane that is less than 0.3.

An apparatus as described herein may include one or more coils or sets of coils configured to exert torques onto a rotatable magnet disposed therein as a result of the passage of currents through the coil(s). Such coil(s) may be referred to herein idiomatically as "Helmholtz" coils though in some embodiments such coils may be implemented as a single coil centered on the rotatable magnet, rather than the traditional two coils disposed opposed the center of the magnet. The apparatus of FIG. 1A includes a first centered "Helmholtz" coil 110 that can be operated (by applying controlled amounts of current thereto) to exert torques onto the magnet 101. Additionally or alternatively, such an apparatus may include a pair of Helmholtz coils 120a, 120b disposed opposite the magnet 101. The direction of the torques exerted by such "Helmholtz" coils is perpendicular to both the direction of the dipole moment of the magnet and the direction of the magnetic field generated by the coils; this is illustrated by the curved arrow in FIG. 1A.

Both types of "Helmholtz" coil (the single centered coil 110 and the pair of coils 120a, 120b disposed opposite the magnet 101) are shown in FIG. 1A to illustrate two possible configurations of coil(s) to exert torques onto a rotatable magnet disposed therein, thereby allowing the rotatable magnet to be operated as a reaction/momentum "sphere" and/or as a three-axis control moment gyroscope. In practice, an apparatus would likely include one or the other (a single centered coil, or two disposed opposite the magnet) to accomplish the exertion of torques magnetically on the magnet. A single coil could be used in order to reduce weight, cost, and complexity. A pair of coils could be used to provide a larger volume, encompassing more of the magnet, with a substantially gradient-free (and thus primarily torque-generating and not translational-force-generating)

magnetic field. Such a pair of coils could also be operated to some degree as "anti-Helmholtz" coils, in order to use the same set of coils to exert both torques and translational forces to levitate the magnet and/or to otherwise maintain the magnet at a specified location relative to the set of coils as the system maneuvers, exerts torques onto the magnet to effect attitude control, vibrates, or experiences other internal or external perturbations.

As noted above, a system capable of exerting torques onto the magnet 101 in three dimensions could include more coils than those illustrated in FIG. 1A. For example, the Helmholtz coils (110 and/or 120a/120b) could be replicated two or more additional times, in respective different directions (e.g., in two directions perpendicular to the illustrated coils 110 and/or 120a/120b and to each other) to allow the complete set of Helmholtz coils to be operated to provide full three-dimensional rotational control of the magnet 101.

An apparatus as described herein may also include "anti-Helmholtz" coils configured to exert translational forces onto a rotatable magnet. Such coils may be operated by applying "opposite" currents thereto, thereby increasing the gradient of a magnetic field generated thereby so as to increase the translational force exerted on the moment of the rotatable magnet. The apparatus of FIG. 1A includes a pair of anti-Helmholtz coils 130a, 130b disposed opposite the magnet 101. Currents can be driven into the coils 130a, 130b such that a magnetic field having a large gradient in a direction along the axis is generated, thereby allowing a force to be exerted on the magnet 101. The direction of that translational force is illustrated by the straight, non-filled horizontal arrow in FIG. 1A.

As noted above, a system capable of exerting translational forces onto the magnet 101 in three dimensions could include more coils than those illustrated in FIG. 1A. In order to provide for the exertion of a translational force onto the magnet 101 that is controllable in all three dimensions, regardless of the orientation of the dipole moment of the magnet 101, at least six such pairs of anti-Helmholtz coils can be arranged about the magnet 101 (e.g., according to the faces of a dodecahedron centered on the magnet 101 or in some other symmetric arrangement). A set of twelve or more coils in such a dodecahedral or other geometric configuration may deviate slightly from the 'perfect' arrangement on the faces of the dodecahedron or other geometric configuration by some amount while still providing nearly the same performance, e.g., with the angles of the planes of the coils differing from the dodecahedral arrangement by less than 30 degrees and the locations of the centers of the coils differing from the centers of the faces of the dodecahedral arrangement by a distance less than 20% of the distance from the centers of the faces of the dodecahedral arrangement to the center of the dodecahedral arrangement.

Note that a set of coils being described as in a "dodecahedral" configuration or arrangement is geometrically equivalent to certain other arrangements. For example, a set of coils in a dodecahedral arrangement, with the coils corresponding to the faces of the dodecahedron, may also be described as being in an icosahedral arrangement, with the coils corresponding to the vertices of the icosahedron.

Such a dodecahedral configuration is the minimum configuration to provide full three-dimensional control of the translational forces magnetically exerted onto the magnet 101 regardless of the magnet's current orientation. However, additional pairs of anti-Helmholtz coils could be provided in order to, e.g., simplify control of the set of coils, to reduce the current capacity (and thus size, weight, and cost) of the individual coils, to provide redundancy, to simplify assembly of the apparatus, or to provide some other benefit. Alternatively, an apparatus could be designed to have fewer coils that are sufficient to translationally control the magnet in three dimensions when the magnet is rotating at a rate above a threshold rate or according to some other constraint and/or the coils could be operated to avoid placing the magnet into un-controllable configurations of orientation, velocity, etc. Such an apparatus could include detents, motors, magnets, or other elements to facilitate the initial start-up of the magnet to achieve a controllable rate of rotation or other controllable configuration. Additionally or alternatively, a subset of the at least six pairs of dodecahedrally-arranged coils could be diminished in size, weight, ability to dissipate energy, etc. such that the diminished coils are only operated transiently to start-up the magnet to achieve a controllable rate of rotation or other controllable configuration, with the non-diminished coils then operated without the diminished coils to levitate or otherwise stabilize the magnet.

The opposed pairs of coils in such a dodecahedral or other arrangement could also be operated to some degree as "Helmholtz" coils, in order to use the same set of coils to exert both torques and translational forces onto the magnet, thereby reducing SWaP. Additionally or alternatively, an apparatus could include separate sets of coils for exerting torques and for exerting translational forces onto the magnet 101, e.g., a set of three orthogonal coils centered on the magnet 101 for exerting torques thereon and a set of twelve or more (e.g., at least six anti-Helmholtz pairs) coils arranged in an, e.g., dodecahedral arrangement in order to exert stabilizing and/or levitational translational forces on the magnet 101.

To control the location and/or orientation of the magnet 101 in a closed-loop manner, the apparatus may include sensors for detecting the location of the magnet relative to the set of coils and/or to detect the orientation of the dipole of the magnet relative to the set of coils. Detection of the translational location of the magnet relative to the set of coils is necessary for closed-loop stabilization of the magnet at a specified location relative to the set of coils (and not in contact with any of the coils or other static elements of the apparatus) and/or levitation of the magnet to counter the effects of gravity and/or of other perturbations or motions of the apparatus.

Information about the deviation of the magnet from the specified location in three dimensions can then be fed into a PID controller or other type of feedback controller in order to predict a translational force to apply to the magnet to maintain it at the specified location. The predicted force can then be translated into a set of currents to apply to the set of coils, e.g., by inverting a relationship between the currents applied to the coils and the force resulting from those currents. The predicted force could be based only on the detected location of the magnet in a feed-back manner; alternatively, the predicted force could include feed-forward elements in order to account for planned maneuvers or other anticipated motions of the apparatus.

For low rotational speeds and/or torques, the orientation of the magnet can be controlled in an open-loop fashion, with the orientation of the magnet's dipole generally corresponding to direction of the applied magnetic field. However, for higher speeds and/or torques, the orientation of the magnet can be detected and used to determine the currents to apply to the coils in order to effect a desired rotation, rotational speed, rotational acceleration, direction of rotation, and/or torque (e.g., by applying a magnetic field having a direction perpendicular to the measured orientation of the dipole moment of the magnet in order to maximize the applied torque for a given coil current).

The apparatus of FIG. 1A includes an orientation sensor 140 for detecting the orientation of the magnet 101. Such an orientation sensor 140 could include a magnetometer configured to detect a direction and/or magnitude of a local magnetic field and that information could then be used to determine the orientation of the magnet 101. Additionally or alternatively, optical means could be used to detect motion of the magnet 101 past the sensor 140 and thus to determine the orientation of the magnet 101. The magnet 101 could include surface marking (e.g., fiducials, pseudorandom patterns) to facilitate optical detection of the rotation of the magnet 101 (and thus to determine at least the relative orientation of the magnet to some initial orientation) and/or to determine the orientation of the magnet 101 directly (e.g., in examples wherein patterns of coloration or other optical properties on the surface of the magnet 101 are specified to permit optical determination of the absolute orientation of the magnet 101). In some examples, the apparatus could include multiple orientation sensors and/or multiple types of orientation sensors. For example, the apparatus could include multiple magnetometers, disposed at multiple different locations relative to the magnet 101, in order to determine the orientation of the magnet 101 more quickly, more accurately, with a higher temporal and/or angular resolution, with lower noise, or in some other improved manner. In another example, the apparatus could include a magnetometer for determining the absolute orientation of the magnet 101 and an optical sensor for determining motion of the magnet 101, with the combination of the sensors allowing for higher temporal and/or angular resolution determination of the magnet 101 orientation (e.g., by using higher-bandwidth relative motion outputs of the optical sensor to augment lower-bandwidth absolute orientation outputs of the magnetometer).

An apparatus as described herein could include a variety of means for detecting the location of a rotatable magnet (e.g., a deviation of that location from a specified set location) relative to a set of coils within which the magnet is disposed. For example, laser interferometers, capacitive sensors, Hall effect sensors, magnetometers, impedance detectors, or some other sensors could be used to detect the absolute or relative position or motion of the magnet, allowing that information to be used to control the coils in a feedback manner to maintain the location of the magnet at a specified set location relative to the set of coils. As depicted in FIG. 1A, such position sensors can include pairs of light emitters 150a, 150b (e.g., LEDs, lasers) and corresponding light detectors 155a, 155b (e.g., photodetectors, photodiodes, active pixel sensors). The locations of the emitters 150a, 150b and detectors 155a, 155b are configured such that beams of light from each light emitter 150a, 150b (indicated by narrow, vertical, non-filled arrows) are partially occluded from reception by the corresponding detector 155a, 155b by the magnet 101. Thus, as the magnet moves in the horizontal direction, the signals output from the detectors 155a, 155b change in a manner that permits horizontal motion of the magnet 101 to be detected. For example, if the magnet 101 moved right, in the frame of FIG. 1A, the beam of light from the right emitter 150b would be more occluded, resulting in a decrease in the amount of light detected by the right detector 155b; conversely, the beam of light from the left emitter 150a would be less occluded, resulting in an increase in the amount of light detected by the left detector 155a. Thus, a difference, ratio, or other comparison between the outputs of the detectors 155a, 155b could be used to detect deviation of the magnet 101 in the horizontal direction from the specified baseline location of the magnet 101. Such a difference, ratio, or other comparison can then be fed into a PID controller or other variety of controller in order to determine currents to apply to various coils (e.g., the anti-Helmholtz coil pair 130a, 130b) in order to maintain the magnet 101 at the specified location.

In addition to, or as an alternative to, the active use of coils (e.g., 130a, 130b) to maintain the location of a rotatable magnet (e.g., 101) at a specified location within a system as described herein, diamagnetic materials can be included in order to passively repel the magnet toward the specified location and/or away from contact with static elements of such a system. Depending on the scale and configuration of the magnet and other elements of the system, such diamagnetic materials could provide sufficient passive repulsive force to completely counteract the force of gravity and/or to prevent the magnet from contacting static elements of the system even in the face of sub-threshold maneuvering and/or perturbations of the system or vibrations at sub-threshold rates of rotation of the magnet, even in the complete absence of active magnetic feedback control of the location of the magnet. Even in embodiments where the system includes such active magnetic levitation/location control, the presence of diamagnetic materials can provide for improved stability in the location of magnet. This can reduce the demands on the active coil systems, thereby reducing their SWAP and/or reducing the complexity of control of those active coils (e.g., reduced bandwidth, increased latency) to maintain the magnet in position without contacting static elements of the system. The presence of the diamagnetic material can also provide a failsafe operational mode for the system even through loss of power or other conditions affecting the ability of the active coils to exert translational forces on the magnet, as the repulsive force needed to repel the magnet in the absence of any torques applied thereto may be sufficiently low to be provided by the diamagnetic material alone.

Figure 1B:
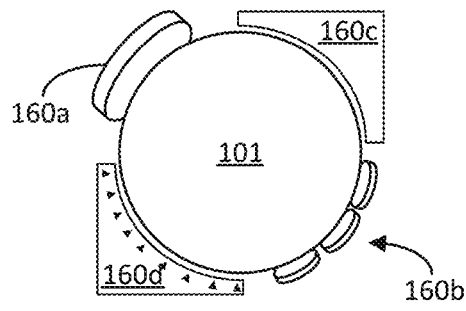
FIG. 1B depicts elements of a system, according to example embodiments

Such diamagnetic materials can be configured in a variety of ways. FIG. 1B depicts a variety of alternative configurations of diamagnetic materials to stabilize the location of a rotatable magnet 101 within an apparatus and/or to levitate the magnet 101 against gravity or some other static or time-varying acceleration. Such diamagnetic materials could be configured as flat discs 160a, 160b disposed proximate to the surface of the magnet 101. For example, each anti-Helmholtz coil of a system could have disposed therein a single disc 160a of diamagnetic material. Alternatively, the diamagnetic material could be configured as a plurality of smaller discs 160b or any other appropriate shape in order to, e.g., reduce size, weight, and cost, to reduce the average distance between the diamagnetic material and the surface of the magnet 101 (and thus to increase the stabilizing repulsive magnetic force therefrom and/or to enhance an air bearing effect between the discs 160b and the magnet 101 when the magnet is rotating at high RPMs). Indeed, the diamagnetic material could be machined, assembled, or otherwise formed to have an internal surface that corresponds with a spherical surface, in order to maximize the repulsive effects (and optionally air bearing effects) of the diamagnetic material by providing some diamagnetic material proximate to as much of the surface of a spherical rotatable magnet 101 as is feasible.

A variety of materials or material composites could be used as such a diamagnetic material. For example, the diamagnetic material could be composed of pyrolytic graphite. In some examples, the diamagnetic material has an intrinsic orientation with respect to its diamagnetic repulsive properties. For example, pyrolytic graphite is most repulsive to magnetic field exerted perpendicular to the cleavage plane of the graphite. For such materials, it can be advantageous to orient the diamagnetic material toward the surface of the rotatable magnet in order to increase the amount of stabilizing repulsive force exerted by the diamagnetic material onto the magnet. This can include orienting individual pieces of the diamagnetic material located at different locations toward the surface of the magnet, e.g., as the disc-shaped diamagnetic materials 160*a*, 160*b* in FIG. 1B.

Where the diamagnetic material is provided as a formed element that is at least partially conformal to the surface of the magnet (e.g., as shaped diamagnetic material 160*c* of FIG. 1B), the diamagnetic material at different locations or regions of the formed element could have respective different material orientations (e.g., directions of the cleavage plane of pyrolytic graphite) to orient the diamagnetic material in those different locations toward the nearest surface of the magnet, thereby increasing the repulsive force generated thereon. This is illustrated by diamagnetic material 160*d* of FIG. 1B, in which the crystal orientation (or other relevant material orientation) of the diamagnetic material (indicated by the arrow heads) varies by location, and is oriented toward the magnet 101 in order to increase the total repulsive diamagnetic force exerted onto the magnet 101. The meaning of this 'crystal' or other orientation refers to the orientation of the crystal that, when directed toward a magnetic material, results in the greatest repulsive force. So, for example, if the diamagnetic material was pyrolytic graphite, the 'crystal orientations' indicated in FIG. 1B are vectors perpendicular to the cleavage plane of the graphite in those regions. Such a location-dependent crystal (or other) orientation could be accomplished in a variety of ways. For example, such a formed conformal element of diamagnetic material could be composed of a plurality of individual tiles or other pieces of the diamagnetic material that have been glued together or otherwise held together such that their crystal orientations, once assembled together, vary with location and are generally directed inward toward the surface of a magnet. Alternatively, the formed conformal element of diamagnetic material could be formed in some other manner to result in this variation of crystal orientation, e.g., by forming pyrolytic graphite onto a curved surface.

A rotatable magnet (e.g., a spherical dipole magnet) disposed within a set of coils as described herein can be operated as a reaction/momentum 'sphere' (i.e., as a three-dimensional analog to one-dimensional reaction/momentum wheels) and/or as a control moment gyroscope. Because the embodiments described herein provide such functionality in a non-contact manner by exerting magnetic forces and torques onto the rotatable magnet, they are able to provide such functionality in an improved manner, with lowered SWaP, increased lifetime (due, e.g., to the lack of mechanical bearings), failsafe and/or zero power operation without momentum 'leakage' (again due, e.g., to the lack of mechanical bearings), and other benefits. Where used as a reaction/momentum 'sphere,' such embodiments allow for reduced SWAP relative to, e.g., single-DOF reaction/momentum wheels, since each reaction/momentum 'sphere' can provide functionality in all three DOF in a single device. Thus, three DOF functionality with single-device redundancy can be provided with only two reaction/momentum 'sphere' devices, while three DOF functionality with single-device redundancy would be provided by four reaction/momentum wheels.

When used as a control moment gyroscope, the embodiments described herein provide a variety of improvements, including SWaP improvement, against traditional gimbaled gyroscopes. Among these improvements are the fact that the embodiments described herein, since they exert torques onto the rotatable sphere in three dimensions via magnetic torques from three (or more) coils, do not exhibit 'singularities' with respect to the ability to rotate the axis of rotation of the spinning magnet. In contrast, the gimbal mechanisms of traditional control moment gyroscope often exhibit such 'singularities,' configurations from which possible manipulations of the axis of rotation of the gyroscope are constrained.

Because the appparatus described herein (e.g., DiaCMG units) contain large rotatable magnets, in their nonoperational (nonrotaing) state they can attract other such apparatus and/or nearby ferromagnetic materials (e.g., of other nearby satellites). This effect can be addressed by launching each satellite (e.g., CubeSat) containing such an apparatus with two examples of the apparatus, with their rotatable magnets anti-aligned, thereby decreasing the effective magentic field of the magnets at large distances. Additionally or alternatively timing of deployment of multiple different small satellites could be specified and/or the separation springs adjusted accordingly.

II. Experimental Results

Figure 2A:
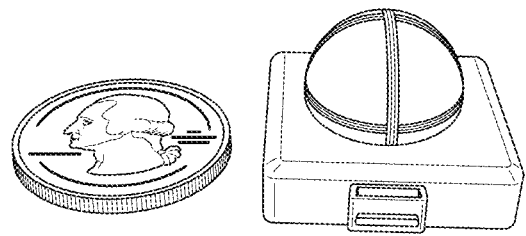
FIG. 2A depicts a diamagnetically levitated control moment gyroscope (DiaCMG), according to example embodiments.
Figure 2B:
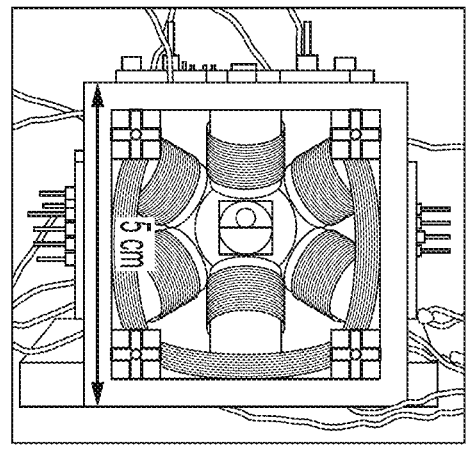
FIG. 2B depicts a working example of a DiaCMG system, according to example embodiments.
Figure 2B:
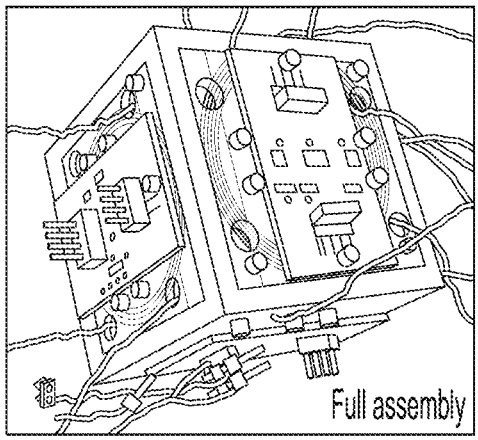
Figure 2B:
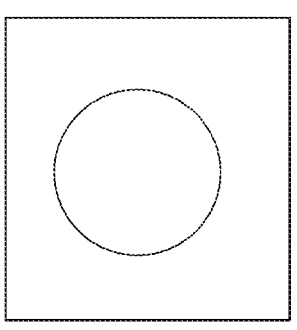
Figure 2B:
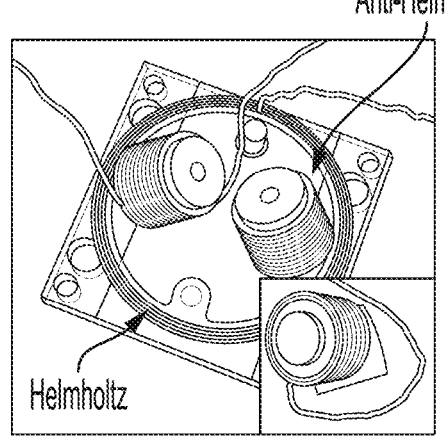

Multi-axis gyroscopes as described herein were designed, built, and experimentally validated. FIG. 2A depicts a rendering of a DiaCMG that includes only three coils, which are arranged orthogonally to each other and that can be used to exert moments onto a spherical dipole magnet (not shown) that is disposed within and repelled by enclosing segments of diamagnetic material (e.g., pyrolytic graphite). FIG. 2B depicts aspects of an assembled experimental system that is capable of using active magnetic levitation of a spherical dipole magnet to bias against Earth's gravity for testing on the terrestrial surface and to account for translational perturbations of the system. The experimental system of FIG. 2B also includes pyrolytic graphite diamagnetic materials to exert pressure on the magnetic sphere, providing passive levitation equal to 35% of the weight of the sphere, stabilizing forces to assist in active levitation, and fail-safe operation in orbit. The experimental system operated up to 54,000 RPM with 6.6 mNm-s of angular momentum storage and up to 0.65 mNm of exerted torque. Such a device may be operated as a reaction sphere (the extension of the concept of the 'reaction wheel' to three dimensions, and three degrees-of-freedom of control) and/or as a three-axis control moment gyroscope (CMG).

This experimental system was able to use active and passive magnetic levitation for three-axis attitude control. The active levitation would permit the device to operate through maneuvers with high g-force loads, up to ~5.7 g. The passive levitation enables zero power-draw for levitation in a space environment and less than 0.33 W of power draw when maintaining a constant spin rate. The experimental system can be used as a test bed for a space-based ACS that is levitated solely by pyrolytic graphite or other diamagnetic materials, allowing the SWAP of the active levitation coils and associated apparatus to be saved while allowing the device to operate through maneuvers up to 0.35 g. Such a system can be operated with the active levitation being used only to cancel the static acceleration of Earth's gravity, allowing other aspects of the design that use the diamagnetic shell for passive levitation and that use other components to control the torques exerted to/from the magnet to be developed and validated on Earth.

The experimental system included a microcontroller running a proportional-integral-derivative (PID) loop to actively control the levitation and rotation of the magnetic sphere disposed within the set of levitating/rotating coils. The PID loop provided control through positional feedback that was provided by a set of LED/phototransistor pairs that inferred the sphere's translational position relative to the coils and from a magnetometer that measured the sphere's orientation relative to the coils. These measurements informed current outputs to the electromagnet coils through a set of drivers (which included operational amplifiers). The active levitation provided a bias against Earth's gravity to experimentally quantify the passive diamagnetic levitation envisioned for an on-orbit control moment gyroscope.

A dodecahedral arrangement of electromagnets is a minimal arrangement such that a dipole magnet may be levitated irrespective of its dipole orientation. The experimental system uses this coil geometry for the levitation coils, and the output currents to effect levitation for a given circumstance (magnet location, orientation, translational velocity, rotational velocity) were determined with a least-squares inversion of a force matrix that described the force that could be exerted by each of the coils when a unit current is applied thereto.

For the experimental system, a target sphere diameter of ¾ inch was chosen for ease of fabrication, which was housed in a 50 mm per side cube. Electromagnets for levitation (configured as anti-Helmholtz coils on opposite sides of the 'dodecahedron' on which the set of levitation coils were disposed) and rotation (which may be referred to herein as "Helmholtz" coils, though in some embodiments such coils may be implemented as a single coil centered on the spherical magnet, rather than two coils disposed opposed the center of the magnet) were designed to maximize the applied force and torque in a small form factor using the current provided by the operational amplifier drivers. The operational amplifier power electronics of the experimental system were 40% efficient. A pulse-width modulation (PWM) architecture would be more than 75% efficient.

Several example devices for the rotor head were fabricated, using a high-resolution SLA printer. The electromagnets were produced using a winding machine. Two final prototypes were produced, one with and one without pyrolytic graphite inserts. The prototypes were fully modular allowing the device to be aligned and serviced during evaluation.

Architecture and Design

As shown in FIG. 2B, the experimental system DiaCMG comprised (1) a head of the control moment gyroscope, enveloping the spherical dipole magnet, electromagnets, and sensors; (2) control electronics for levitation and high-speed rotation; and (3) PID firmware programmed into the control electronics for three-axis control moment gyroscope operation. Table 1 summarizes the four different prototypes and modes of operation that were experimentally developed. The elements of teh experimental DiaCMG system are discussed below.

TABLE 1

| DiaCMG prototype summary. Control electronics were about 41% power efficient. Future PWM power electronics could be over 75% power efficient. | | | | |
|---|---|---|---|---|
| | Open loop (OL) | Open loop with diamagnetic inserts | Open loop with diamagnetic inserts (CLD) | Open loop, 4 pi rotation, diamagnetic inserts (OLD4) |
| Magnetometer feedback | — | — | Yes | — |
| Diamagnetic inserts | — | Yes | Yes | — |
| Max frequency of operation observed | 900 Hz | 900 hz | Tested to 500 Hz, upper bound not determined | Tested to 100 Hz, upper bound not determined |
| Max torque observed | 0.1 mNm | Not measured | 0.65 mNm | Not measured |
| Torque coil power consumption acros 2 HH coils @ 500 Hz | 2 × 3 W = 6 W | 2 × 3 W = 6 W | 2 × 7 W = 14 W (w/max torque) | — |
| Levitation coil power consumption across 6 AH coils @ 500 Hz | 6 × 0.14 W = 0.84 W | 6 × 0.08 W = 0.48 W | 6 × 0.2 W = 1.2 W (w/max torque) | — |
| Wall power consumption | 16 W | 15 W | 34 W | — |
| Standard deviation of x/y/z phototransistor difference voltage, mV (~micron) | (19.0, 20.8, 28.3) | (20.2, 24.0, 35.4) | (13.8, 2.6, 20.6) | (17.0, 3.3, 8.5) |

TABLE 1-continued

| | | | |
|---|---|---|---|
| DiaCMG prototype summary. Control electronics were about 41% power efficient. Future PWM power electronics could be over 75% power efficient. | | | |
| | Open loop (OL) | Open loop with diamagnetic inserts | Open loop with diamagnetic inserts (CLD) | Open loop, 4 pi rotation, diamagnetic inserts (OLD4) |
| Maximum displacement from set point @ 500 Hz, mv (~micron) | (151, 174, 213) | (43, 53, 117) | (6.9, 8.5, 90.2) | (35.9, 11.6, 20.6) |
| Comments | Ran sphere to operating frequency then braked, i.e. reaction sphere operation. Tested at phi = pi/4. | Ran sphere to operating frequency then braked, i.e. reaction sphere operation. Tested at phi = pi/4. | Ran sphere at max torque to operating frequency, then braked, i.e. reaction sphere operation. Tested at phi = 0. | CMG operation: Rotated axis of rotation during operation. 1 revolution every 9 seconds. |

Diamagnetically Levitated Control Moment Gyroscope

The gyro head was composed of a single spherical neodymium dipole magnet, ¾ inch diameter and having a magnetic moment $|\vec{m}|=4$ Am$^2$. It was housed within a set of six anti-Helmholtz coil pairs, which produced respective magnetic field gradients that in turn exerted force on the magnetic dipole. Each of the coils of the six pairs (i.e., twelve coils total) was disposed about the magnet by the 3D-printed rotor head according to a dodecahedral arrangement. This was analytically determined to be a minimal arrangement to fully control and center the sphere's x, y, and z position. For a single anti-Helmholtz pair, i, the force is represented as $\vec{F}_i = \nabla(\vec{m} \cdot \vec{B}_{AH,i}(I_i))$, where $\vec{B}_{AH}$ $(I_i)$ is the magnetic field generated for a given current through the coils. This expression becomes $$\vec{F}_i = \vec{M}_i I_i, \text{ where}$$

$$\vec{M}_i = \frac{k}{2}\left[-\vec{m} + 3\left(\vec{m} \cdot \hat{s}_i\right)\hat{s}_i\right]$$

For a set of coils with axes given by, $\{\hat{s}_1, \hat{s}_2, \ldots, \hat{s}_6\}$, and with currents, $\{I_1, I_2, \ldots, I_6\}$, the net force on the sphere is then $$\vec{F} = \sum_i \vec{M}_i I_i.$$

The force vector above is non-singular for any dipole orientation, $\hat{m}$, if the coil axes are aligned to the axes through the 12 opposite faces of a dodecahedron, namely $$\hat{s}_1 = \frac{1}{c}[\,0 \quad 1 \quad \varphi_{gr}\,]^T,$$

$$\hat{s}_2 = \frac{1}{c}[\,0 \quad 1 \quad -\varphi_{gr}\,]^T,$$

$$\hat{s}_3 = \frac{1}{c}[\,1 \quad \varphi_{gr} \quad 0\,]^T,$$

$$\hat{s}_4 = \frac{1}{c}[\,1 \quad -\varphi_{gr} \quad 0\,]^T,$$

-continued $$\hat{s}_5 = \frac{1}{c}[\,\varphi_{gr} \quad 0 \quad 1\,]^T,$$

$$\hat{s}_6 = \frac{1}{c}[\,-\varphi_{gr} \quad 0 \quad 1\,]^T,$$

where $$\varphi_{gr} = \frac{1 + \sqrt{5}}{2} \approx 1.618034$$

(the golden ratio) and $c = \sqrt{1 + \varphi^2} \approx 1.90211$. This is the smallest set of pairs of anti-Helmholtz coils that is able to fully control the x, y, and z position of the magnetic dipole regardless of the orientation of the magnetic dipole.

Figures 3, 4:
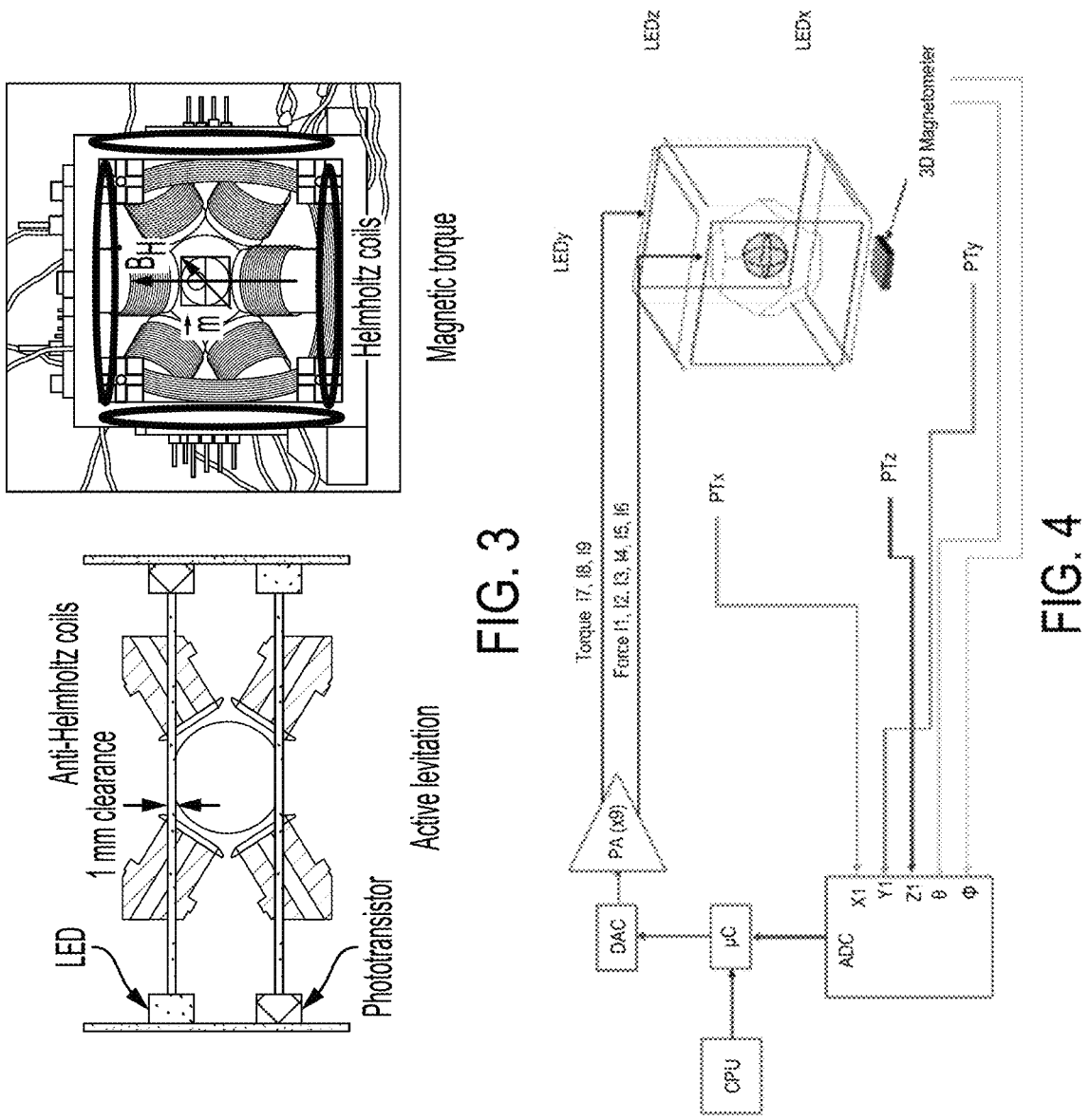
FIG. 3 is a schematic showing active levitation control (left), and the magnetic torque that can be applied using a constant magnetic field generated by a Helmholtz coil on the faces of a DiaCMG (right), according to example embodiments.
FIG. 4 is a schematic depicting elements of an example system, according to example embodiments.

The x, y, and z positions of the magnet were probed using pairs of light-emitting diodes (LEDs) and corresponding phototransistors as shown in FIG. 3. These permitted inference of the relative position of the sphere based on the differences between paired phototransistor output voltages, e.g., $\Delta V_x = \alpha \Delta x$. Accordingly, the feedforward plus feedback force may be expressed as $$\vec{F} = (PID_x(\alpha\Delta V_x)\,\hat{e}_x + PID_y(\alpha\Delta V_y)\hat{e}_y + (1 + PID_z(\alpha\Delta V_z))\hat{e}_z)F_g,$$

where $\alpha$ is a user-chosen scaling factor and $F_g$ is the force due to gravity on the magnetic dipole. PID loops determine the requisite feedback force output at any given point in time. Given the desired force, the required current in the coils can ber found by inverting the first expression above:

$$\vec{I} = (\bar{M}^T\bar{M})^{-1}\bar{M}^T\vec{F}.$$

This matrix can been determined for arbitrary magent ($\theta$, $\phi$). The maximum current required in any given coil of the experimental system was 0.44 A to resist the force due to gravity and, thus, to levitate the sphere when teh expeiremental system was non-moving at the surface of the Earth.

To rotate the sphere, a second set of electromagnets was provided, configured as Helmholtz coil pairs, with a radius of about 40 mm. Three sets of Helmholtz coils were aligned to the x, y, and z axes, and a linear combination of currents in these coils was able to produce a near constant (i.e., nearly gradient-free) magnetic field in teh neighborhood of the magnet in any direction. The magnetic field from these coils, $\vec{B}_H$, exerts torque onto the magnetic dipole, $\vec{\tau} = \vec{m} \times \vec{B}_H$. For most of the experimental program, the device was operated in open-loop (OL) mode with respect to the magnetic dipole orientation. Thus $\vec{m}$ and $\vec{B}_H$ were nearly parallel, exerting a maximum torque of 0.1 mNm as empirically observed. In the final stages of the experimental program, a magnetometer recorded the orientation of $\vec{m}$, enabling closed-loop (CL) operation. In this mode of operation, $\vec{B}_H$ could be applied nearly perpendicular to $\vec{m}$, enabling a theoretical 2.1 mNm of torque and an empirically measured 0.65 mNm of torque (while in CL operation).

In addition to the electromagnets, a diamagnetic material, pyrolytic graphite, was introduced onto the faces of the anti-Helmholtz coils, as shown in FIG. 2B. The force between a diamagnetic material and a magnet may be expressed as $$F = \frac{\chi V}{\mu_0} B \frac{dB}{dz},$$

where X is the magnetic susceptibility per unit volume, V is the volume of the diamagnetic material, and B is the magnetic field generated by the permanent magnet. The pyrolytic graphite discs were created having 1 cm diameter and 2 mm thickness, providing up to 96 mNm of passive force on the magnetic sphere across the 12 sides of the dodecahedron (about ⅖ the force due to gravity on the Earth's surface, 250 mNm). In orbit, the control moment gyro would be in a constant state of free-fall, so the passive levitation above is the maximum force the gyro could experience during maneuvers, 0.35 g, without also providing active levitation. The additional of the electromagnets described above, operated in active levitation mode, would enable 6.7 g of maneuver acceleration.

Control and Power Electronics

FIG. 2B shows a bird's eye view of the control and power electronics, and FIG. 4 provides a schematic of the operation of those electronics. A Teensy microcontroller served as DAQ for the phototransistor and magnetometer inputs and used those inputs in a PID control loop. The output of the PID control loop was fed into a set of nine operational amplifiers, which served as current sources for driving the electromagnets. Six operational amplifiers fed the anti-Helmholtz (levitation) electromagnets, and three fed the Helmholtz (torque) electromagnets. This arrangement enabled levitation for any orientation of the magnetic dipole, $\vec{m}$, and for rotation around any axis.

The experimental system control and power electronics were not optimized for power efficiency, drawing 15 W OL (34 W CL) during operation, as compared to 6.5 W OL (14 W CL) consumed by the coils in OL operation. These results indicate a power efficiency of about 40%. More power-efficient current supply electronics, using pulse width modulator drivers, increase the power efficiency from 40 to 75 percent.

PID Firmware

As remarked above, a PID controller was implemented on the Teensy controller. The PID calculated an error term, e (t), for each phototransistor pair and for the magnetometer reading, which measured the difference between the setpoint or expected values and the measured values. Based on this error term, the controller generated a PID value, $$PID(t) = K_p e(t) + K_i \int_0^t e(t')dt' + K_d \frac{de(t)}{dt}.$$

The PID value was then used to generate the instantaneous currents applied to the levitation anti-Helmholtz electromagnets $$\vec{F} = (PID_x(t)\,\hat{e}_x + PID_y(t)\hat{e}_y + (1 + PID_z(t))\hat{e}_z)F_g$$

and $$\vec{I} = (\bar{M}^T \bar{M})^{-1} \bar{M}^T \vec{F}.$$

Figure 5:
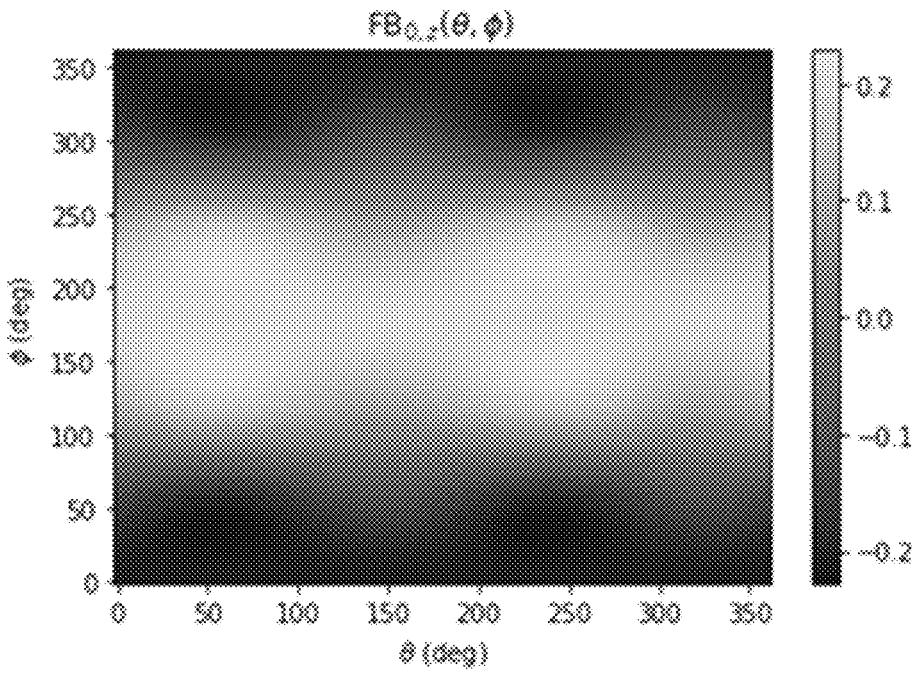
FIG. 5 depicts an example feedback matrix element (channel 0, z-axis) across all $(\theta, \phi)$, according to example embodiments.

The original implementation of the PID loop specified trajectories, $(\theta(t), \phi)$ or $(\theta, \phi(t))$, with an N=200 discretization from 0 to $2\pi$. This approach used large feed-forward and feed-back matrices of dimension (200,9) and (200,6,9) respectively, which, along with other matrices in the microcontroller, consumed its available memory. A new implementation was generated that expressed the feedback matrices across (0, 0) as 14×14 matrices in the two dimensions (e.g., as in FIG. 5). The control moment gyro was then provided rates, $f_\theta$ and $f_\phi$, to rotate the sphere (e.g., as $\theta(t)=f_\theta t$, $\phi(t)=f_\phi t$), and the instantaneous feedforward and feedback terms were interpolated from the reduced-size 2D input matrix. This enabled three-axis control of the control moment gyroscope.

High-Speed Reaction Sphere Operation

Figure 6:
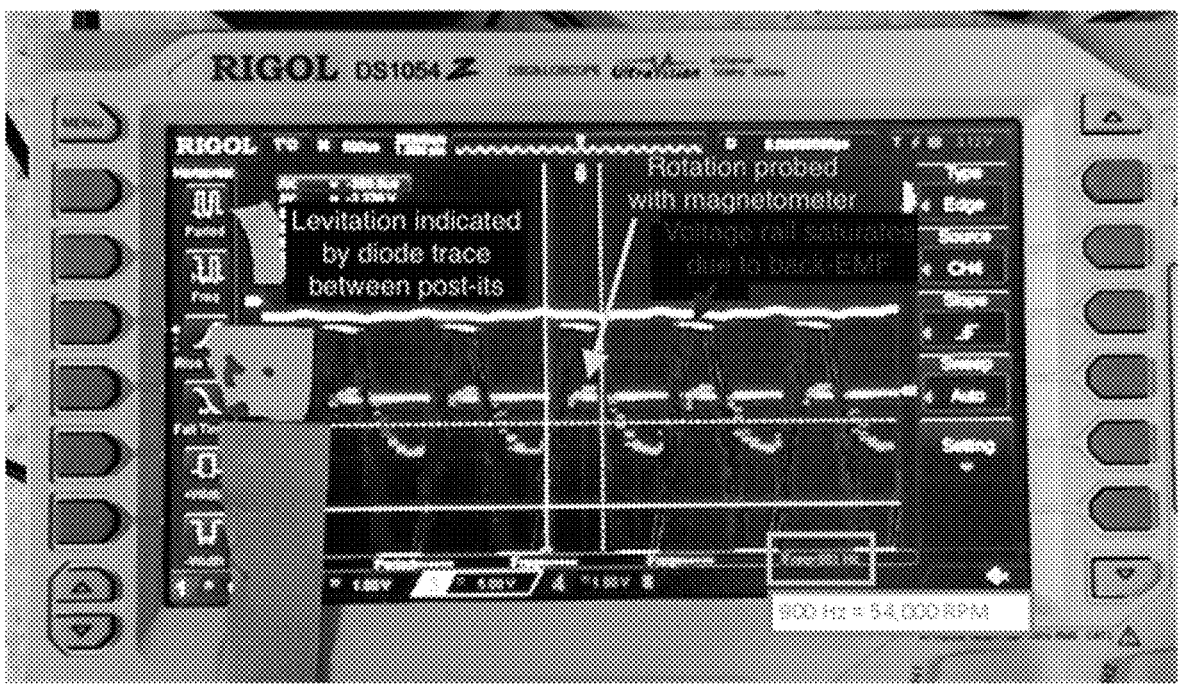
FIG. 6 depicts oscilloscope traces from experimental open-loop operation at 900 Hz of a working example of the embodiments described herein.

The implemented experimental system architecture was able to spin the ¾ inchdiameter sphere up to 54,000 RPM (900 rotations per second), see FIG. 6. With a moment of inertia of $$I = \frac{2}{5}mr^2 = 1000\,\text{g-mm}^2,$$

this coresopnded to an angular moment storage of L=Iω=5.9 mNm-s. At the max spin speed of 54,000 RPM, the prototype become unstable due to clipping of the input voltage from the substantial back-EMF on the Helmholtz coils (see next section and FIG. 6). For most other experimental testing, a spin speed of 30,000 RPM (500 rotations per second) was used as it was more stable, and failure was never observed below the maximum torque thresholds.

The maximum torque was empirically measured in open- and closed-loop modes of operation. The torque was inferred by determining the minimum time to bring the experimental system up to 30,000 RPM. The torque was then calculated as $\tau = I\Delta\omega/\Delta t$. A maximum of 0.1 mNm of torque in OL operation and 0.65 mNm of torque in CL operation was recorded.

These specifications mark the DiaCMG experimental system as a state-of-the-art reaction sphere, with the experimental device being competitive with commercial-off-the-shelf (COTS) solutions (Table 2). For example, when compared to COTS solutions, the DiaCMG experimental system achieves comparable torque and momentum storage per unit volume with low idle power consumption.

Table 2—COTS comparison. Power measurements for the DiaCMG exeprimental system were empirically recorded from electromagnet power consumption and do not include inefficiencies from power and control electronics. Wall power is reported in Table 1.

| Device | Device type | L [mNms] | τ [mNm] | Max time at τ | # DOF | Size [mm] (mm^3) | Volume [mm3] | Weight [g] | Manevuering Power [pmW] | Steady state power [mW] |
|---|---|---|---|---|---|---|---|---|---|---|
| DiaCMG CL PG | CMG/reaction sphere | 5.9 | 0.65 | ∞ | 3 | 50 × 50 × 50 | 125 (42 per DOF) | 240 | 14000 (4700 per DOF) | <330 (110 per DOF) |
| Honeybee | Single axis CMG | 56 | 112 | ∞ | 1 | 48 × 48 × 91 | 210 | 600 | 1500 | 2000 |
| BCT RWP015 | Reaction wheel | 15 | 4 | 3.8 s | 1 | 42 × 42 × 19 | 34 | 130 | <1000 | <1000 |
| NewSpace NCTR-M003 | Mangetorquer | NA | 0.013 | ∞ | 1 | 72 × 15 × 13 | 14 | 30 | 250 | 0 |
| Cube Space CubeWheel | Reaction wheel | 1.8 | 0.23 | 7.8 | 1 | 28 × 28 × 26.2 | 21 | 60 | 650 | 150 |
| Hyperion RW210 | Reaction wheel | 1.5 | 0.1 | 15 s | 1 | 25 × 25 × 15 | 9 | 48 | 800 | 65 |

Impact of Back-EMF

The rotating magnetic sphere generates a back-electromotive force (EMF), i.e., voltage, in the coils used to rotate the sphere. The back-EMF is expressed as $$\varepsilon = N\, \partial_t \int_s \vec{B} \cdot \hat{e}_n \; dA \approx \frac{0.35\,\mathrm{Nm}\,\mu_0 f}{2\,R}[\cos\theta - \sin\theta],$$

where N is the number of loops in the coils, the integration is performed of the cross-sectional area of the Helmholtz coils, f is the rotation rate of the magnet, R is the radius of the Helmholtz coils, and θ is the magnet orientation at some instant in time. With this geometry and 30 loops per Helmholtz coil, the maximum induced EMF is about 9 V at an operational speed of 54,000 RPM. By experimental observation, this back-EMF was sufficient to prevent operation with the experimental system's 12 V rail (see FIG. 6). The rail was saturated as the Helmholtz coils needed an additional 3.8 V (~1 A at 3.8 Ohm) to operate at the commanded level.

This limitation could be negated by increasing the rail operating voltage, for example to a voltage in the range of 60 to 120 V, which would increase the maximum operating frequency by a factor of 5 to 10. Alternatively, the number of loops in the Helmholtz coils could be decreased from 30 loops to 3 or 6 to reduce the back EMF, with a corresponding increase in the operating current by a factor of 3 to 6 to generate the same magnetic field. PWM current drivers are able to provide such high currents at low voltage with an efficiency of 75%.

Ultimate Speed

Across the experimental program, the rotation rate of the experimental DiaCMG system was increased from an initial 6,000 to 54,000 RPM by increasing the clearance between the magnetic sphere and the levitating pillars shown in FIG. 3. The rotation rate was limited by the back EMF of the spinning magnet, but implementing the above modifications could increase the operational RPM to the bursting threshold of approximately 1 MRPM.

Torque

The maximum torque was limited by the magnetic moment of the neodymium sphere and the maximum magnetic field the Helmholtz coils were able to generate, $\tau_{max}$=mB. The Helmholtz magnetic field can be increased, $$B_H = \left(\frac{4}{5}\right)^{\left(\frac{3}{2}\right)} N\,\mu_0\,I/R,$$

by increasing the current or the number of coil loops. An increase in the number of loops in the Helmholtz coils would increase the back-EMF, limiting the maximum rotation rate for a given rail voltage. Thus, there is a trade-off in the design of the DiaCMG between maximum torque and angular momentum storage.

Note that there is a distinction to be drawn between the maximum controlled torque and the maximum applied torque. The maximum controlled torque in CL operation, 0.65 mNm, can be used for attitude control. The maximum applied torque was 2.1 mNm when the torque magnetic field and the magnetic moment were perpendicular, but the experimal system as implmented was note able to achieve this for attitude control. The controlled torque could be improved by optimizing PID parameters.

Passive Diamagnetic Levitation

Figure 7:
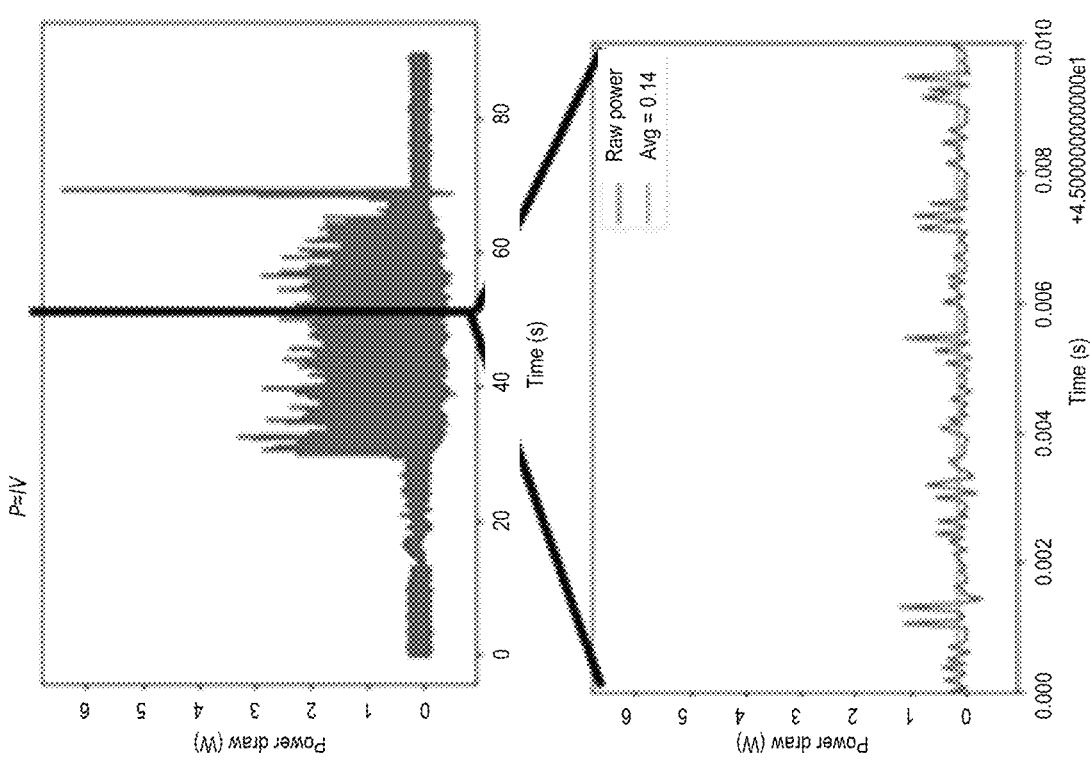
FIG. 7 shows experimental results of power consumption without pyrolytic graphite.
Figure 7:
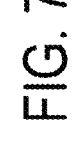
Figure 7:
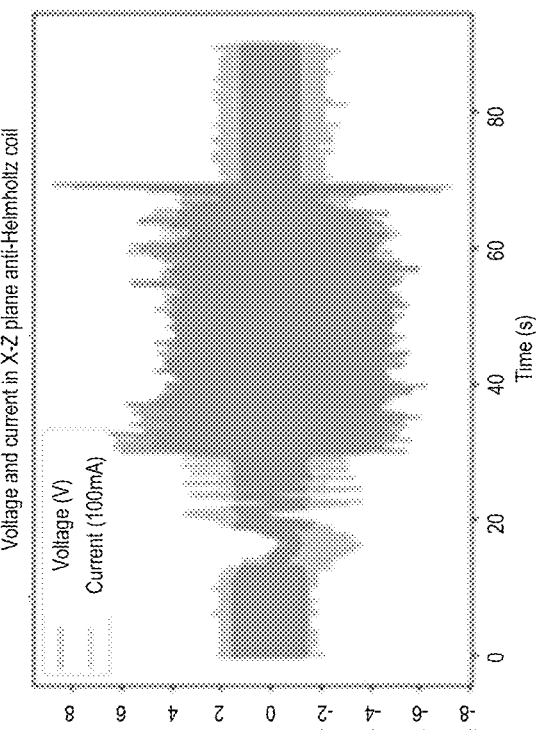
Figure 8:
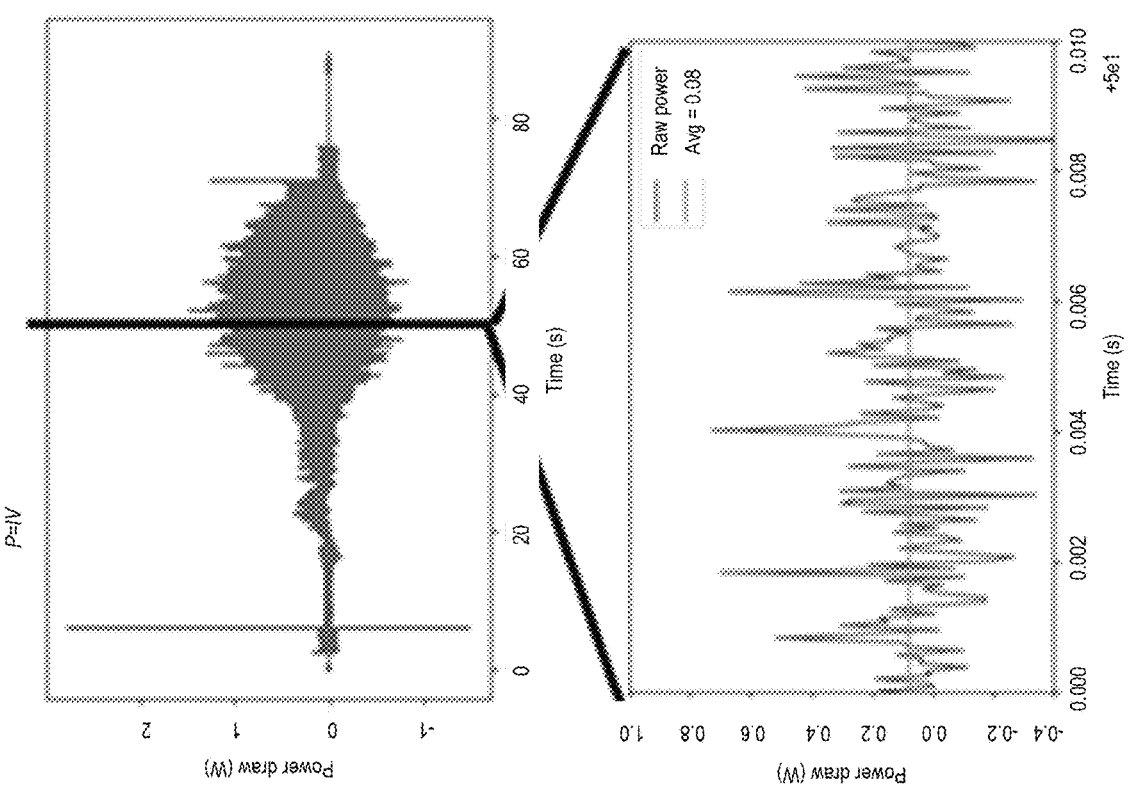
FIG. 8 shows experimental results of power consumption with pyrolytic graphite.
Figure 8:
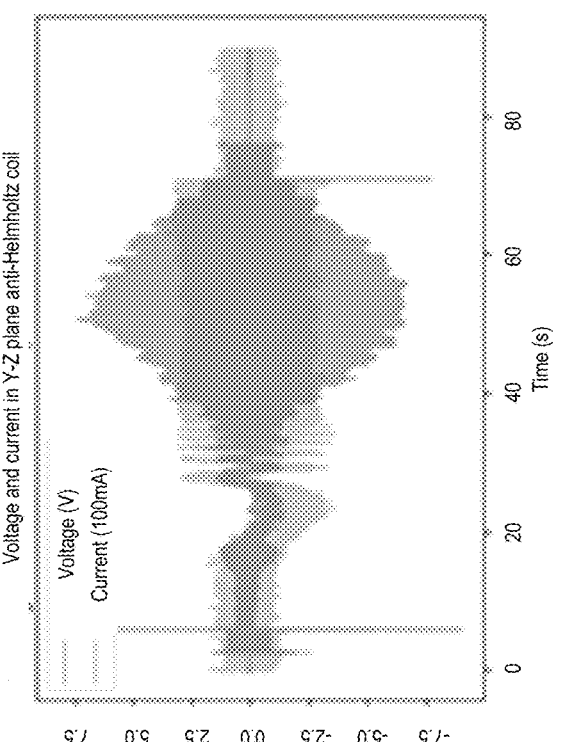
Figure 9A:
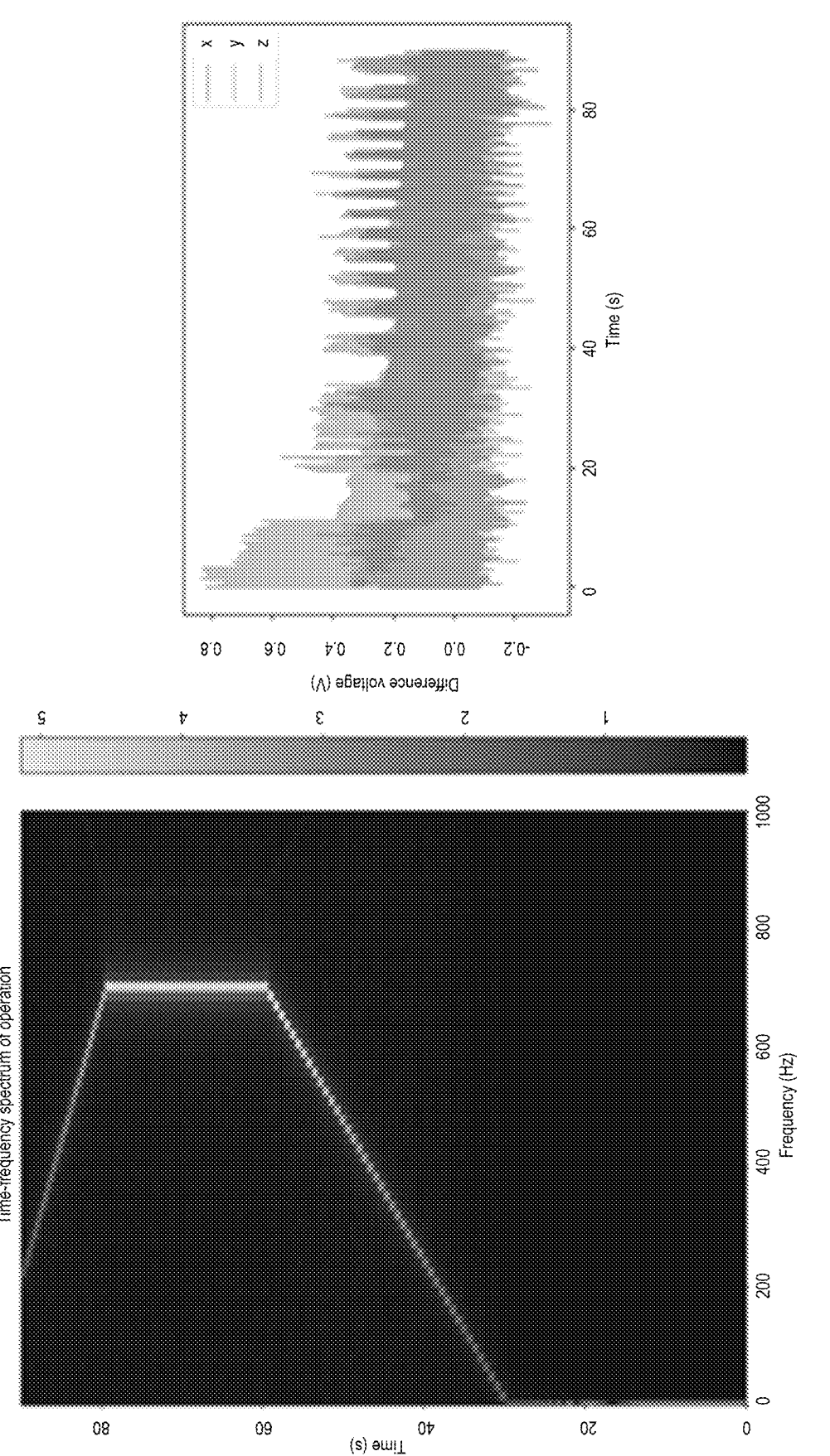
FIG. 9A shows experimental result spectra of DiaCMG operation and stability without diamagnetism.
Figure 9B:
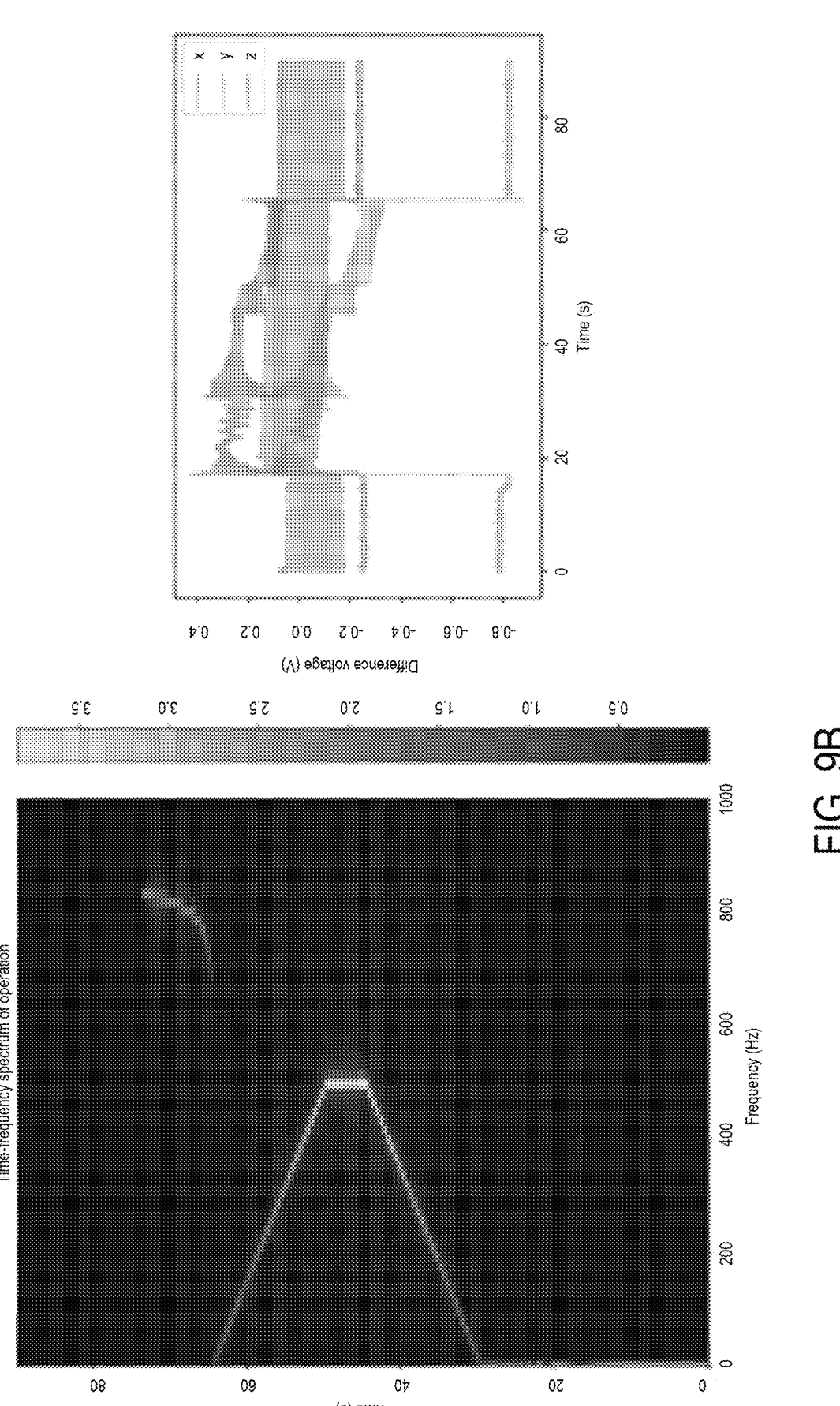
FIG. 9B shows experimental result spectra of DiaCMG operation and stability with diamagnetism.

The introduction of pyrolytic graphite discs into the DiaCMG experimental system led to an apparent weight reduction of α=35% of the neodymium sphere. This was determined by reducing the applied levitation current until the sphere no longer lifted against the top-side of the device. Additional testing was conducted to see how the pyrolytic graphite affected power consumption of the active magnetic feedback during operation (see FIGS. 7 and 8). An observed power consumption decrease from $P_0$=0.14 W to $P_G$=0.08 W was recorded; this compared favorably to an expected $\alpha^2 P_0$=0.06 W. An improvement in stability was also observed, as shown in FIG. 9. This increased stability may be the result of the diamagnetic force providing additional stability and/or the added confinement from the graphite pads providing additional stability through an air bearing effect.

Experimental testing with the pyrolytic graphite indicated no impact on the maximum operational torque nor on the maximum operational frequency. In particular, OL operation at 900 Hz with the pyrolytic graphite implied an upper bound on the power dissipation from eddy currents in the pyrolytic graphite, namely $\tau_{drag}$ (900 Hz)<0.1 mNm and $$\frac{\tau_{drag}}{f} < 10^{-4} \text{ mNms.}$$

These eddy currents place an additional limit on the experimental DiaCMG system's rotation rate, since the power dissipation from eddy currents increases as $P \propto f^2$ and thus exerts a torque according to $\tau_{drag} \propto f$. Note that 0.1 mNm was the experimentally observed upper bound on viscous drag from air, as testing was performed under atmosphere.

Closed-Loop, High-Torque Control

Initially, the DiaCMG experimental system was controlled with a rotating magnetic field nearly parallel to the magnetic moment of the sphere. CL feedback was implemented and tested to apply magnetic fields perpendicular to the magnetic moment in order to increase the applied torque.

The Helmholtz coils (large diameter rings on the top-bottom and left-right of the DiaCMG system, see FIG. 3) generate a magnetic field, $\vec{B}$, and in turn applied torque, $\vec{\tau}$, on the magnetic sphere with magnetic moment, $\vec{m}$, as given by $$\vec{\tau} = \vec{m} \times \vec{B}.$$

The system operated in OL feedback, thus, $\vec{m}$ and $\vec{B}$ were nearly parallel, and the angle between them, $\theta$, was near-zero. In this mode of operation, $\vec{m}$ was not actively monitored, and the applied torque, $\tau = mB \sin \theta$, was very small. $\tau_{max}$=0.1 mNm was inferred by recording the shortest period t in which DiaCMG could be accelerated to f=30000 RPM without failing.

In CL operation, the orientation of $\vec{m}$ may be monitored with a Hall monitor, and the control electronics can apply a magnetic field perpendicular to the magnetic moment, $\theta$=90°. This increased the maximum torque to $\tau_{max}$=mB=2.1 mNm, where the magnetic moment of the sphere was 4 Am$^2$, and the maximum magnetic field the Helmholtz coils were able to apply was 700 μT.

Figure 10:
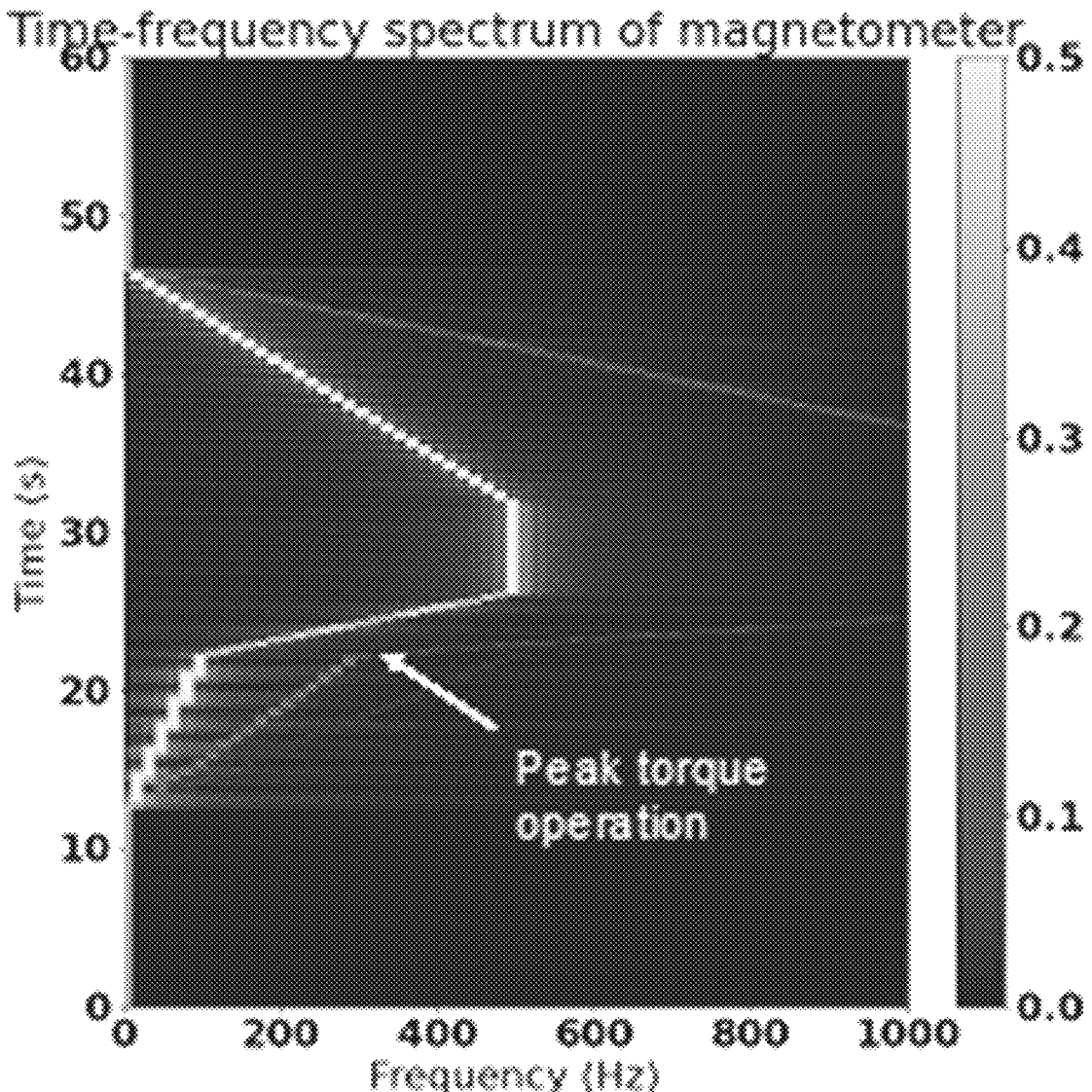
FIG. 10 shows an experimental result time-frequency spectrum of closed-loop operation showing 0.65 mNm torque, i.e. $\Delta\omega=2\ \pi(400\ Hz)$ in $\Delta t=4$ s.
Figures 11A, 11B:
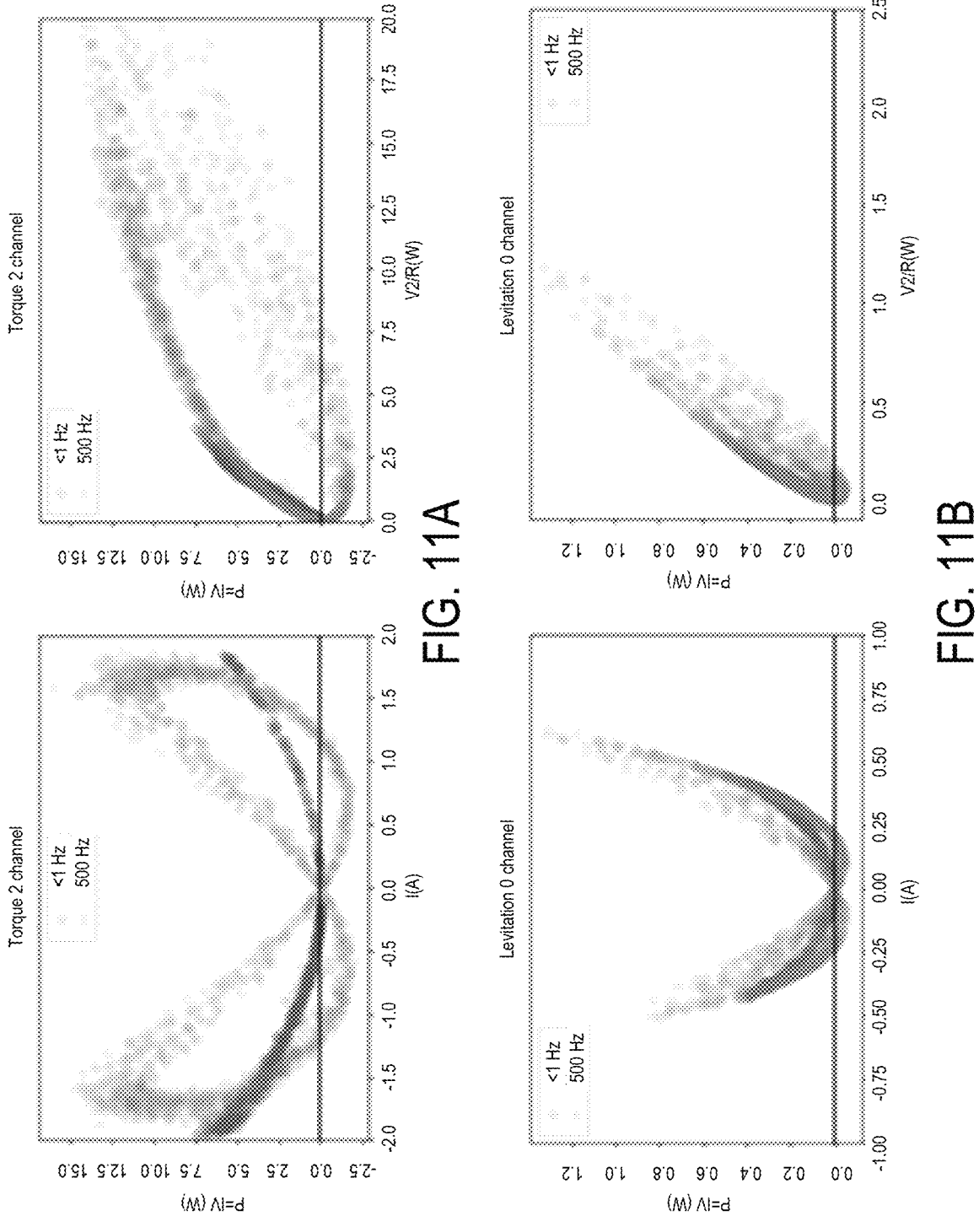
FIG. 11A shows experimental result power traces with applied and returned power in Helmholtz coils with respect to (left) current and (right) ohmic power.
FIG. 11B shows experimental result power traces with applied and returned power in anti-Helmholtz coils with respect to (left) current and (right) ohmic power.

In practice, it was possible to apply 0.65 mNm of torque in CL operation. This was empirically determined by accelerating the sphere from 100 to 500 Hz in 4 s—the shortest time segment in which this acceleration could be achieved (see FIG. 10). The PID parameters could be further tuned and the durability of the system increased to improve this performance. Test results (see FIG. 11) also provide insight into the returned power from the Helmholtz coils to the operational amplifier.

Full Control Moment Gyroscope Operation

Figure 12:
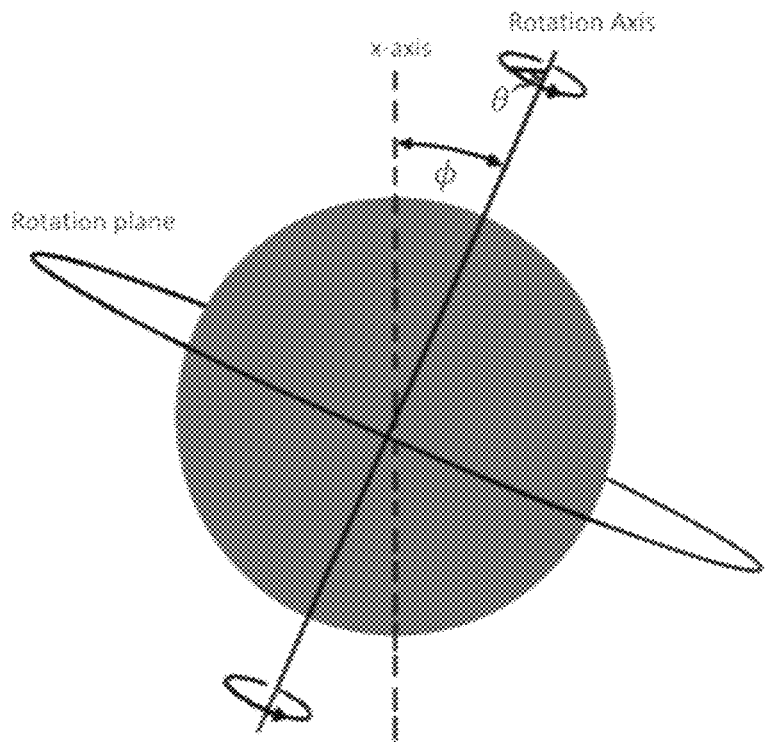
FIG. 12 is a schematic showing control moment gyroscope operation, according to example embodiments.

The final upgrade to the DiaCMG experimental system demonstrated full control moment gyroscope operation, as shown in the schematic of FIG. 12. Namely, as $\theta$ rotated at a fixed frequency, it was possible to slowly rotate $\phi$, which generates torque, $$\tau = \frac{dL}{dt} \sim I\dot{\phi}.$$

Figure 13:
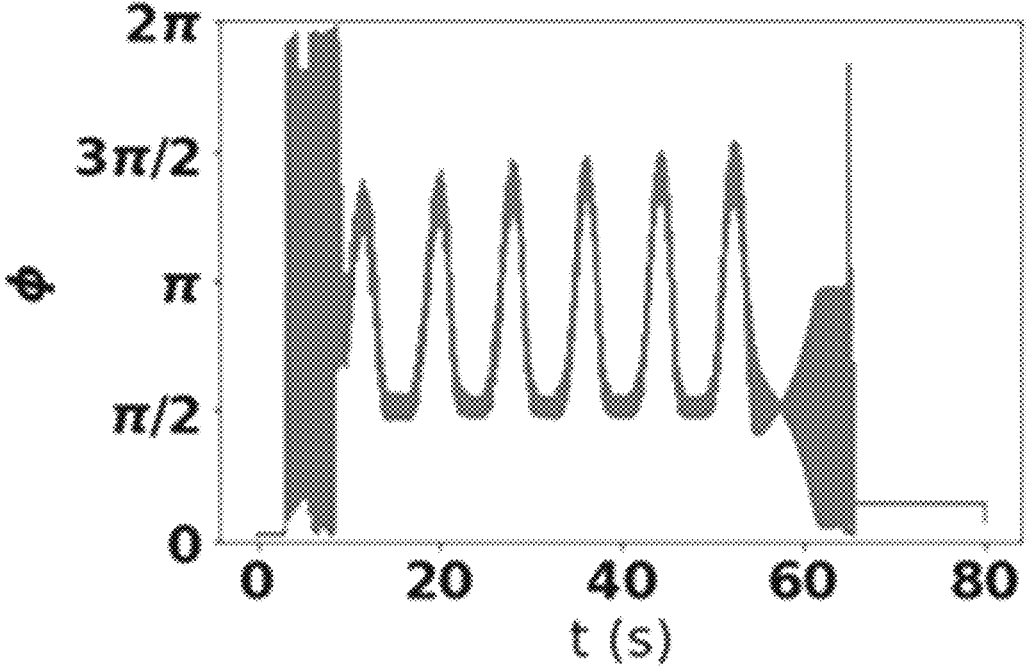
FIG. 13 is an experimental result spectrum showing axis of rotation during full control moment gyroscope operation.

A firmware upgrade from 1D to 2D rotational operation increased the size of the feed-forward and feed-back matrices on the microcontroller as described in the section above on PID firmware. To demonstrate this operational mode, the experimental DiaCMG system was operated at 100 RPM and $\phi$ was increased at a rate of 1 revolution per 9 seconds. The orientation of the rotation plane was probed with the magnetometer, FIG. 13, and an LED connected to many loops of wire was used as an EMF indicator. When the wire loops were perpendicular to the plane of rotation, the LED lights, which allowed real time observation of the plane of rotation, moved from the X-Z to the Y-Z plane. Post-processing showed the same behavior based on the magnetometer reading.

Scaling

As the experimental system is scaled in size, the torque per unit mass and angular momentum per unit mass should stay constant to provide a consistent degree of maneuverability and stability. Likewise, the anti-Helmholtz levitation coils will supply additional current to maintain levitation of the larger rotor mass.

Fixing $$\frac{|\vec{\tau}|}{m} \propto \frac{N_H I_H}{r},$$

torque per rotor mass is maintained if $N_H I_H \propto r$, where $N_H$ is the number of loops in the Helmholtz coils and $I_H$ is the current in the coils. The power consumption in the Helmholtz coils then scales as $P \propto r^2$ or $$\frac{P}{m} \propto \frac{1}{r}.$$

The angular momentum per unit rotor mass, $$\frac{L}{m} \propto r^2 \omega,$$

is constrained by the back-EMF, $$\varepsilon \propto N_H r^2 \omega \propto N_H \frac{L}{m}.$$

Assuming the back-EMF is fixed, angular momentum per rotor mass can be improved by decreasing the number of turns in the Helmholtz coils, which also reduces the torque per rotor mass. This represents a fundamental trade-off between maneuverability and stability for the experimental DiaCMG system.

With respect to the force per unit mass, $$\frac{F_{AH}}{m},$$

the anti-Helmholtz coils generate lift in proportion to the rotor radius, $F_{AH} \propto |\vec{m}| \propto r^3$. Meanwhile, mass is also proportional to the radius cubed, $m \propto r^3$, so no additional current is required to lift rotors of larger (or smaller) radii.

The force per unit mass, $$\frac{F_{PG}}{m},$$

from the diamagnetism of the pyrolytic graphite does not, however, favor larger rotors. With $F_{PG} \propto r^2$, the force per unit mass decreases with rotor radius as $$\frac{F_{PG}}{m} \propto \frac{1}{r}.$$

Thus, for large rotor radii, pyrolytic graphite is eventually useful primarily to enable fail-safe operations when power is lost and to provide some increased stability in on-orbit operations, for example preventing collision with the side walls of the gyroscope under power failure conditions. This will not, however, enable fast maneuvers. For very small rotor radii, passive levitation from pyrolytic graphite is likely sufficient for most con-ops.

Space Environment

The experimental system disclosed presented here establishes the potential for a 3-DOF control-moment gyroscope (as a "reaction sphere") that has eliminated mechanical friction. The current experimental system provides a test bed that can artificially simulate a zero-G environment by using the levitation coils to bias against gravity. Thus, testing that normally would require testing in drop towers, reduced gravity aircraft, or in-orbit validation can be performed more easily and at lower cost on Earth.

III. Example Systems

Figure 14:
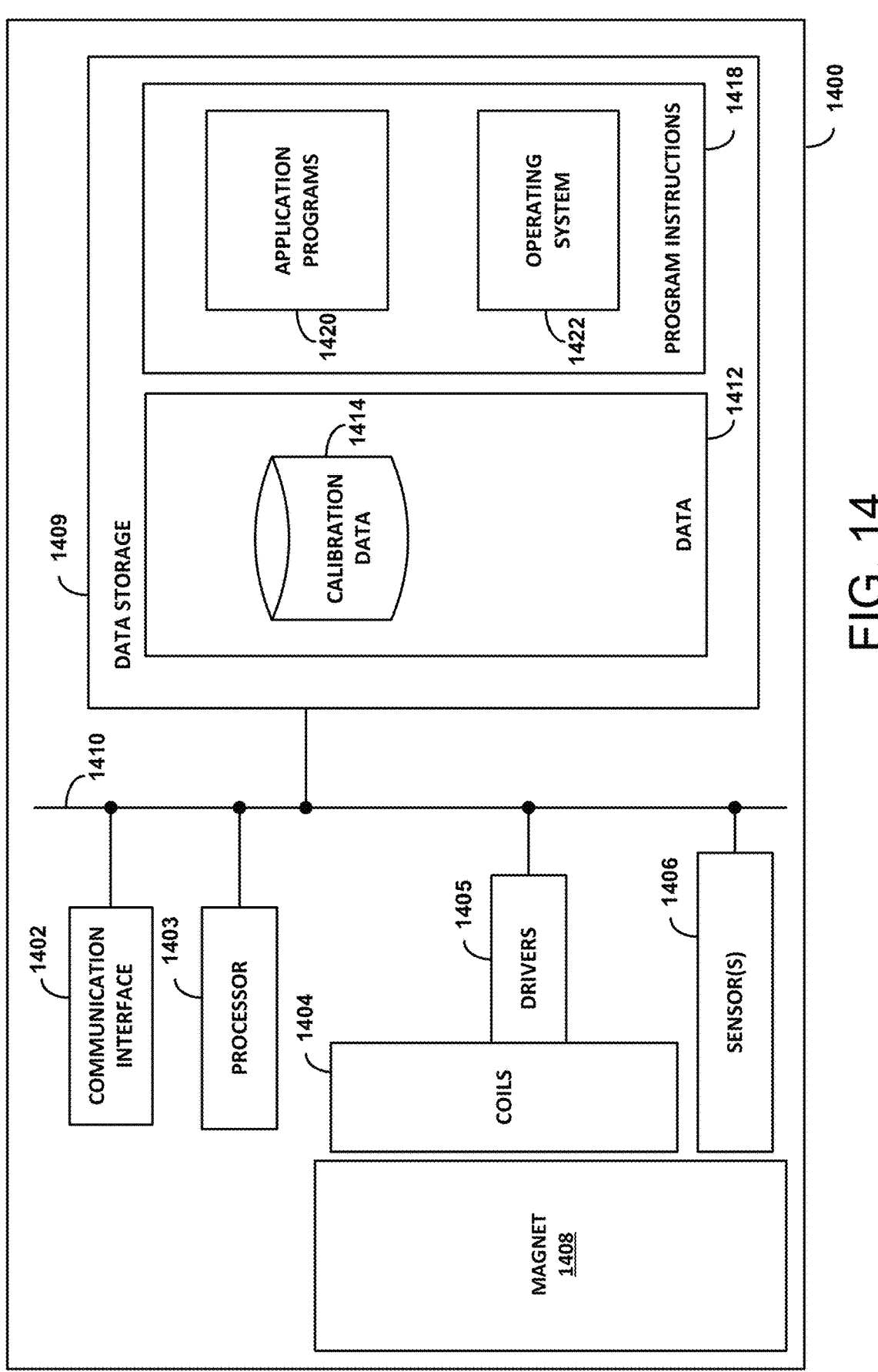
FIG. 14 is a schematic showing elements of an example system, according to example embodiments.

FIG. 14 illustrates an example system 1400 that may be used to implement the methods described herein and/or that may be or include part or all of one or more systems as described herein. By way of example and without limitation, system 1400 may be a satellite or part of a satellite (e.g., an attitude control subsystem of a satellite), a cubesat or part of a cubesat or other microsatellite system, or all or part of some other system in order to provide three degrees of freedom of attitude control and/or momentum storage/release. It should be understood that system 1400 may represent a physical device such as a satellite, a particular physical hardware subsystem that could be part of a larger system (e.g., by being mechanically, electrically, thermally, and/or otherwise coupled to a host system), or other combinations of hardware and software that are configured to carry out the functions and/or to incorporate the elements described herein.

As shown in FIG. 14, system 1400 may include a communication interface 1402, a processor 1403, a set of coils 1404 driven by driver circuitry 1405, a rotatable magnet 1408 disposed within the set of coils, one or more sensor(s) 1406 configured to detect a location and/or orientation of the magnet 1408 relative to the set of coils 1404, and data storage 1409, all of which may be communicatively linked together by a system bus, network, or other connection mechanism 1410.

The set of coils 1404 could include a variety of Helmholtz and/or anti-Helmholtz coils configured to, when appropriately driven by the drivers 1405, magnetically exert torques onto the magnet 1408 to control an orientation, rotational speed, rotational acceleration, axis of rotation, or other properties of the orientation of the magnet 1408. Such a set of coils 1404 could also optionally be operable to exert translational forces onto the magnet 1404 to maintain the magnet 1404 at a specified location relative to the set of coils 1404, e.g., to counteract the force of gravity, to adjust for perturbations experienced by the system 1400, to adjust for planned or otherwise anticipated maneuvers or other predicted perturbations of the system 1400, to account for vibration of the magnet 1408, to account for the center of mass of the magnet 1408 being off-center from the center of mass of the system 1400 when exerting torques onto the magnet 1408 for attitude control of the system 1400, or to account for some other factor or scenario. Additionally or alternatively, the system 1400 could include a diamagnetic material configured to stabilize the location of the magnet 1408 within the set of coils 1404 by exerting repulsive magnetic forces thereon. The set of coils 1404 could be operated to use the magnet 1408 as the rotating mass in a reaction/momentum 'sphere' and/or a control moment gyroscope.

Communication interface 1402 may function to allow system 1400 to communicate, using analog or digital modulation of electric, magnetic, electromagnetic, optical, or other signals, with other devices, access networks, and/or transport networks. Thus, communication interface 1402 may facilitate circuit-switched and/or packet-switched communication, such as Internet protocol (IP) or other packetized communication. For instance, communication interface 1402 may include a chipset and antenna arranged for wireless communication with a radio access network or an access point. Also, communication interface 1402 may take the form of or include a wireline interface, such as an Ethernet, Universal Serial Bus (USB), or High-Definition Multimedia Interface (HDMI) port, in order to communicate with other systems, e.g., with a master controller or system bus of a satellite of which the system 1400 forms an attitude control subsystem thereof. Communication interface 1402 may also take the form of or include a wireless interface, such as a WiFi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 1402. Furthermore, communication interface 1402 may comprise multiple physical communication interfaces (e.g., a WiFi interface, a BLUETOOTH® interface, and a wide-area wireless interface).

Processor 1403 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). Data storage 1409 may include one or more volatile and/or non-volatile storage components, such as magnetic, optical, flash, or organic storage, and may be integrated in whole or in part with processor 1403. Data storage 1409 may include removable and/or non-removable components.

Processor 1403 may be capable of executing program instructions 1418 (e.g., compiled or non-compiled program logic and/or machine code) stored in data storage 1409 to carry out the various functions described herein. Therefore, data storage 1409 may include a non-transitory computer-readable medium, having stored thereon program instructions that, upon execution by system 1400, cause system 1400 to carry out any of the methods, processes, or functions disclosed in this specification and/or the accompanying drawings. The execution of program instructions 1418 by processor 1403 may result in processor 1403 using data 1412.

By way of example, program instructions 1418 may include an operating system 1422 (e.g., an operating system kernel, device driver(s), and/or other modules) and one or more application programs 1420 (e.g., functions for performing data collection, attitude detection and correction, communication with planetary station(s), or other mission objection activities, functions for determining a location and/or orientation of the system 1400 in space, and/or determining a relative location and/or orientation of another satellite system in space) installed on system 1400. Data 1412 may include calibration data (e.g., information about the alignment and other properties of the coils of the set of coils 1404 and how currents passed therethrough affect the location and/or orientation of the magnet 1408 relative thereto) 1414.

Application programs 1420 may communicate with operating system 1422 through one or more application programming interfaces (APIs). These APIs may facilitate, for instance, application programs 1420 detecting the current state (orientation, location, rotation axis and speed) of the magnet 1408, driving the magnet 1408 from a stopped state to a 'spun up' state, braking the magnet 1408 from a 'spun up' state to a stopped state, injecting and/or extracting momentum into/from the magnet 1408, adjusting an orientation of an axis of rotation of the magnet 1408, and so on.

IV. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A system comprising:
a set of coils;
a dipole magnet disposed within the set of coils such that the dipole magnet has three degrees of freedom of rotation within the set of coils;
a first sensor configured to detect an orientation of the dipole magnet relative to the set of coils; and
a second sensor configured to detect a location of the dipole magnet relative to the set of coils, wherein the set of coils is operable to control a location and orientation of the dipole magnet relative to the set of coils based on outputs of the first sensor and second sensor.

2. The system of claim 1, wherein the set of coils comprises at least six pairs of coils, wherein each pair of coils of the at least six pairs of coils comprises a respective first coil and a respective second coil that are aligned with each other and disposed opposite the dipole magnet.

3. The system of claim 2, wherein the at least six pairs of coils are disposed around the dipole magnet in a dodecahedral arrangement.

4. The system of claim 2, further comprising a controller configured to:
operate the first sensor to determine an orientation of the dipole magnet relative to the set of coils;
operate the second sensor to determine a location of the dipole magnet relative to the set of coils; and
based on the detected orientation and location of the dipole magnet, operate the at least six pairs of coils to maintain a location of the dipole magnet within the at least six pairs of coils.

5. The system of claim 4, further comprising diamagnetic material, wherein the diamagnetic material is disposed around the dipole magnet to stabilize the location of the dipole magnet within the at least six pairs of coils.

6. The system of claim 4, wherein the set of coils additionally comprises three coils, and wherein the controller is additionally configured to, based on the detected orientation and location of the dipole magnet, operate the three coils to adjust an orientation of the dipole magnet relative to the set of coils.

7. The system of claim 4, wherein the controller is additionally configured to, based on the detected orientation and location of the dipole magnet, operate the at least six pairs of coils to adjust an orientation of the dipole magnet relative to the set of coils.

8. The system of claim 4, wherein the controller is additionally configured to obtain an anticipated motion of the system, and wherein the controller operating the at least six pairs of coils to maintain the location of the dipole magnet within the at least six pairs of coils comprises operating the at least six pairs of coils based on the anticipated motion of the system and the detected orientation and location of the dipole magnet.

9. The system of claim 1, further comprising diamagnetic material, wherein the diamagnetic material is disposed around the dipole magnet to stabilize the location of the dipole magnet within the set of coils.

10. The system of claim 9, wherein a first portion of the diamagnetic material located at a first location has a first crystal orientation, wherein a second portion of the diamagnetic material located at a second location that differs from the first location and that has a second crystal orientation, and wherein the first and second orientations differ from each other and are both directed towards the dipole magnet.

11. The system of claim 1, wherein the dipole magnet is a first dipole magnet and the set of coils is a first set of coils, and wherein the system further comprises:
a second dipole magnet;
a second set of coils; and
a controller configured to:
during a first period of time, control an orientation of the system by operating the second set of coils to control a rotation of the second dipole magnet and, based on outputs of the first sensor and second sensor, operating the first set of coils to control a rotation of the first dipole magnet;

determine, subsequent to the first period of time, that an operational capacity of the first dipole magnet, first set of coils, first sensor, and second sensor has degraded; and responsive to determining that the operational capacity has degraded, control an orientation of the system by operating the second set of coils to control a rotation of the second dipole magnet.

12. The system of claim 1, further comprising a controller configured to:

operate the set of coils to cause the dipole magnet to rotate about a first axis relative to the set of coils; and subsequently operate the set of coils to adjust the axis of rotation of the dipole magnet from the first axis to a second, different axis relative to the set of coils.

13. The system of claim 1, wherein the dipole magnet is at least one of a spherical dipole magnet, a cylindrical dipole magnet with flat ends, a cylindrical dipole magnet with curved ends, or a spherical shell of magnetic material enclosing a non-magnetic material.

14. A system comprising:

a set of coils;

a dipole magnet disposed within the set of coils such that the dipole magnet has three degrees of freedom of rotation within the set of coils, wherein the set of coils is operable to control an orientation of the dipole magnet relative to the set of coils; and diamagnetic material, wherein the diamagnetic material is disposed around the dipole magnet to stabilize the location of the dipole magnet within the set of coils.

15. The system of claim 14, wherein a first portion of the diamagnetic material located at a first location has a first crystal orientation, wherein a second portion of the diamagnetic material located at a second location that differs from the first location and that has a second crystal orientation, and wherein the first and second orientations differ from each other and are both directed toward the dipole magnet.

16. The system of claim 14, further comprising a controller configured to:

operate the set of coils to cause the dipole magnet to rotate about a first axis relative to the set of coils; and subsequently operate the set of coils to adjust the axis of rotation of the dipole magnet from the first axis to a second, different axis relative to the set of coils.

17. A system comprising:

a set of coils;

a dipole magnet disposed within the set of coils such that the dipole magnet has three degrees of freedom of rotation within the set of coils;

diamagnetic material disposed around the dipole magnet to stabilize the location of the dipole magnet relative to the set of coils; and a controller configured to operate the set of coils to maintain a location of the dipole magnet relative to the set of coils and to control an orientation of the dipole magnet relative to the set of coils.

18. The system of claim 17, wherein the set of coils comprises at least six pairs of coils disposed around the dipole magnet in a dodecahedral arrangement, and wherein the controller operating the set of coils to maintain the location of the dipole magnet relative to the set of coils comprises the controller operating the at least six pairs of coils to maintain the location of the dipole magnet within the at least six pairs of coils.

19. The system of claim 18, wherein the controller operating the set of coils to control the orientation of the dipole magnet relative to the set of coils comprises the controller operating the at least six pairs of coils to control the orientation of the dipole magnet.

20. The system of claim 17, wherein the controller is additionally configured to obtain an anticipated motion of the system, and wherein the controller operating the set of coils to maintain the location of the dipole magnet relative to the set of coils comprises operating the set of coils based on the anticipated motion of the system.

* * * * *